(12) United States Patent
Chambers

(10) Patent No.: US 10,611,433 B2
(45) Date of Patent: Apr. 7, 2020

(54) HYDRAULIC BICYCLE COMPONENT CONTROL DEVICE

(71) Applicant: SRAM, LLC, Chicago, IL (US)

(72) Inventor: Rafer Chambers, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 177 days.

(21) Appl. No.: 15/470,128

(22) Filed: Mar. 27, 2017

(65) Prior Publication Data
US 2018/0274562 A1   Sep. 27, 2018

(51) Int. Cl.
| | |
|---|---|
| *F15B 7/08* | (2006.01) |
| *B62M 25/08* | (2006.01) |
| *B62K 23/06* | (2006.01) |
| *B62K 19/36* | (2006.01) |
| *B62L 3/02* | (2006.01) |
| *B62J 1/08* | (2006.01) |

(52) U.S. Cl.
CPC ............. *B62M 25/08* (2013.01); *B62K 19/36* (2013.01); *B62K 23/06* (2013.01); *B62L 3/023* (2013.01); *B62J 2001/085* (2013.01)

(58) Field of Classification Search
CPC .......... B60T 7/102; B60T 11/22; B60T 11/18; B60T 11/228; B60T 11/11; B60T 11/30; B60T 17/06
USPC .......................................................... 60/594
See application file for complete search history.

(56) References Cited

U.S. PATENT DOCUMENTS

| | | | | |
|---|---|---|---|---|
| 2,230,419 A | * | 2/1941 | White | B60T 11/224 60/578 |
| 2,242,676 A | * | 5/1941 | Jurs | F16K 31/46 60/570 |
| 2,294,351 A | * | 8/1942 | White | B60T 11/16 188/153 R |
| 4,501,340 A | * | 2/1985 | Yoshida | B62K 23/02 137/351 |

(Continued)

FOREIGN PATENT DOCUMENTS

| | | | |
|---|---|---|---|
| DE | 202011107630 U1 | 12/2011 | |
| GB | 849147 A * | 9/1960 | ............ B60T 11/228 |
| TW | M427339 U | 4/2012 | |

OTHER PUBLICATIONS

Kazimer, Mike, Novyparts RockShox Reverb Remote Review, PINKBIKE, Feb. 8, 2017, 15 pages, http://www.pinkbike.com/u/mikekazimer/blog/novypartsrockshoxreverbremotereview.html.

*Primary Examiner* — Thomas E Lazo
*Assistant Examiner* — Matthew Wiblin

(57) ABSTRACT

A control device is for a hydraulic valve bicycle component and has a housing defining a fluid port in fluid communication with a hydraulic valve of a bicycle component and has a lever having a proximal end coupled to the housing and a distal end. The proximal end of the lever is rotatable about a pivot axis. The lever includes an actuation surface near the distal end. The control device has a cavity within the housing. The cavity includes a fluid chamber in fluid communication with the fluid port. The control device has a piston disposed within the cavity and movable by actuation of the lever along a piston axis. A first plane perpendicular to the piston axis and containing the piston axis is offset a distance from a second plane perpendicular to the piston axis and extending through the actuation surface of the lever.

31 Claims, 14 Drawing Sheets

(56) References Cited

U.S. PATENT DOCUMENTS

| | | | | |
|---|---|---|---|---|
| 4,635,442 | A | * | 1/1987 | Bass ........................ B62L 3/023 |
| | | | | 188/344 |
| 4,674,541 | A | * | 6/1987 | Fulmer ................... B60T 17/06 |
| | | | | 138/31 |
| 9,216,793 | B2 | | 12/2015 | Carrasco Vergara et al. |
| 2003/0121736 | A1 | * | 7/2003 | Lumpkin ................ B60T 7/102 |
| | | | | 188/151 R |
| 2014/0033850 | A1 | * | 2/2014 | Clement ................ B62M 25/04 |
| | | | | 74/473.14 |
| 2015/0083531 | A1 | * | 3/2015 | Abhold ................... B62K 23/06 |
| | | | | 188/151 R |
| 2016/0347301 | A1 | * | 12/2016 | Gallagher ............. B60T 17/222 |

* cited by examiner

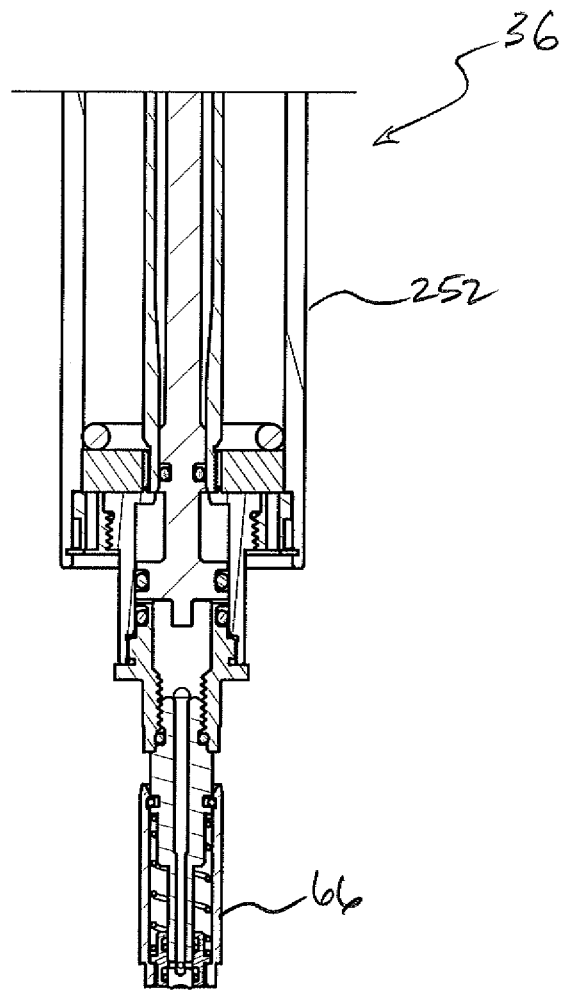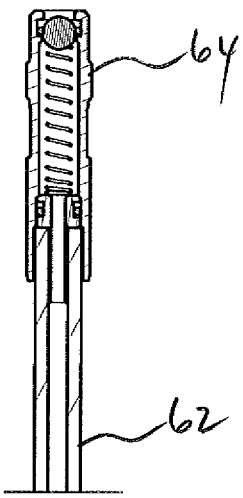
Fig. 3

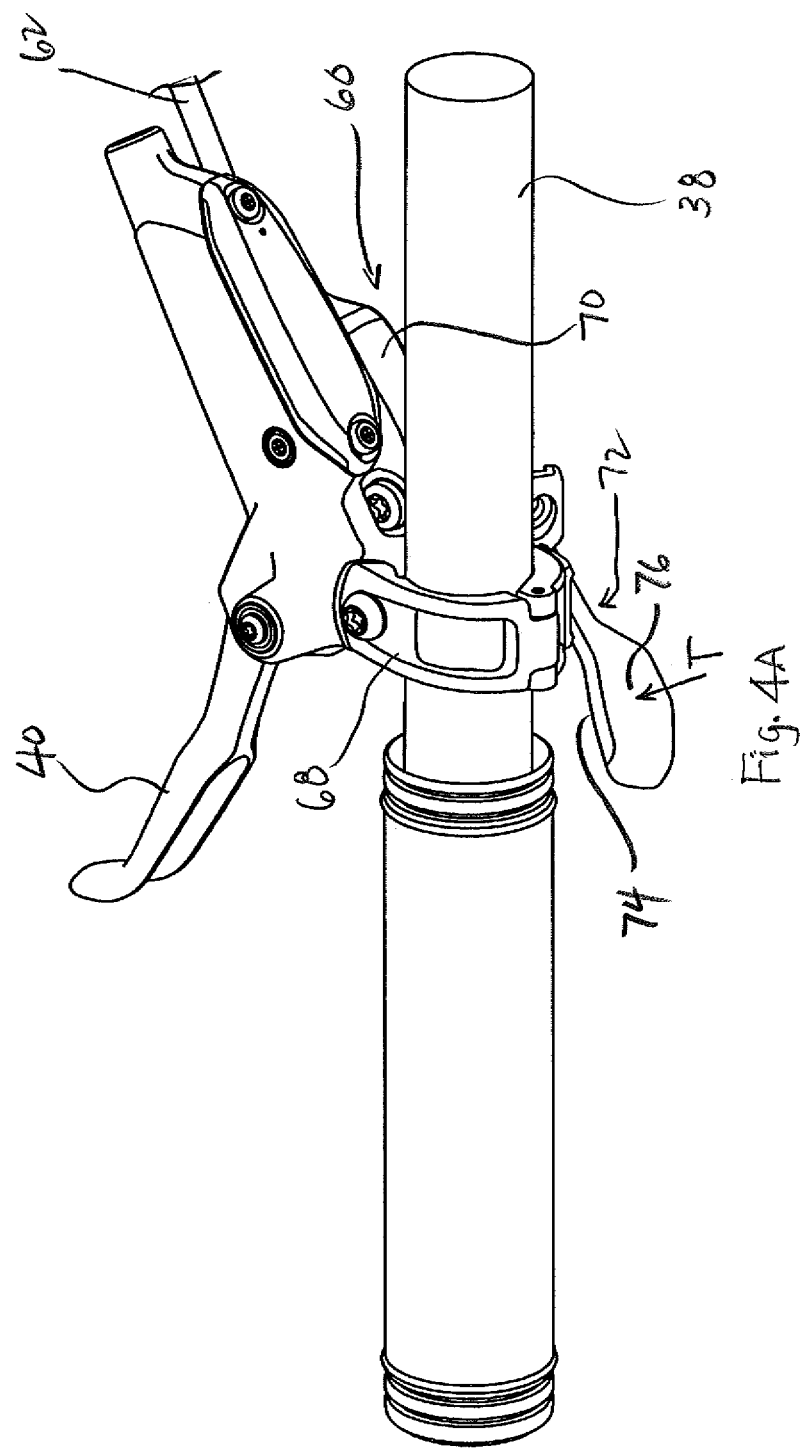

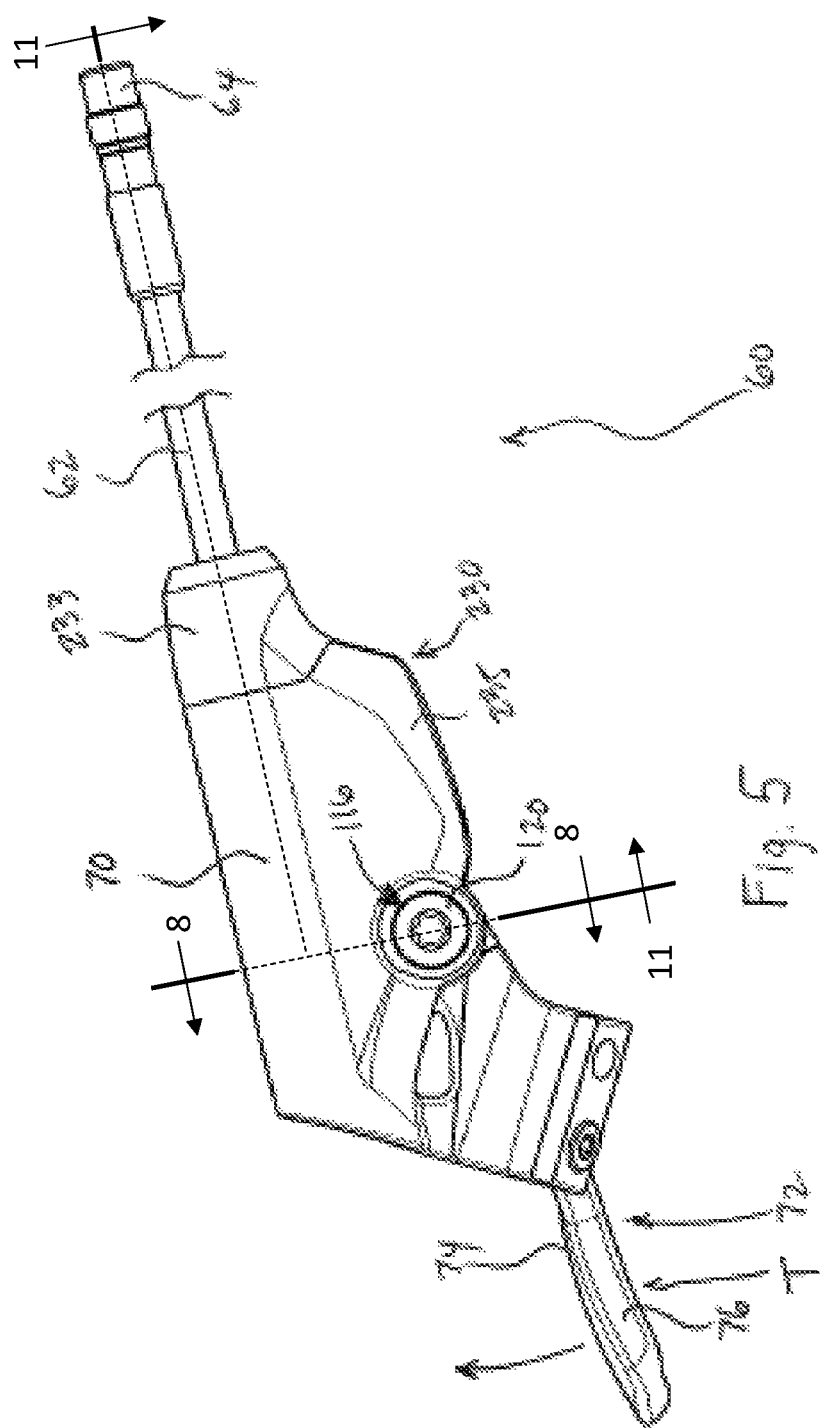

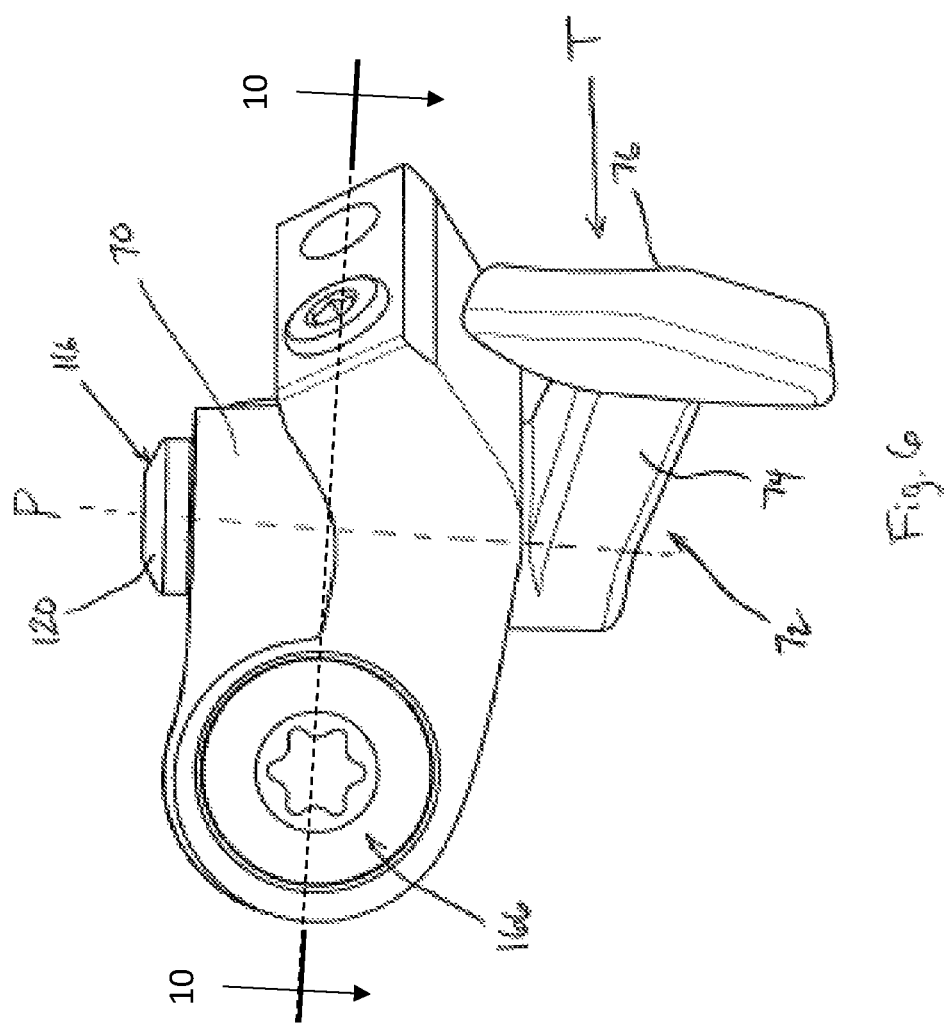

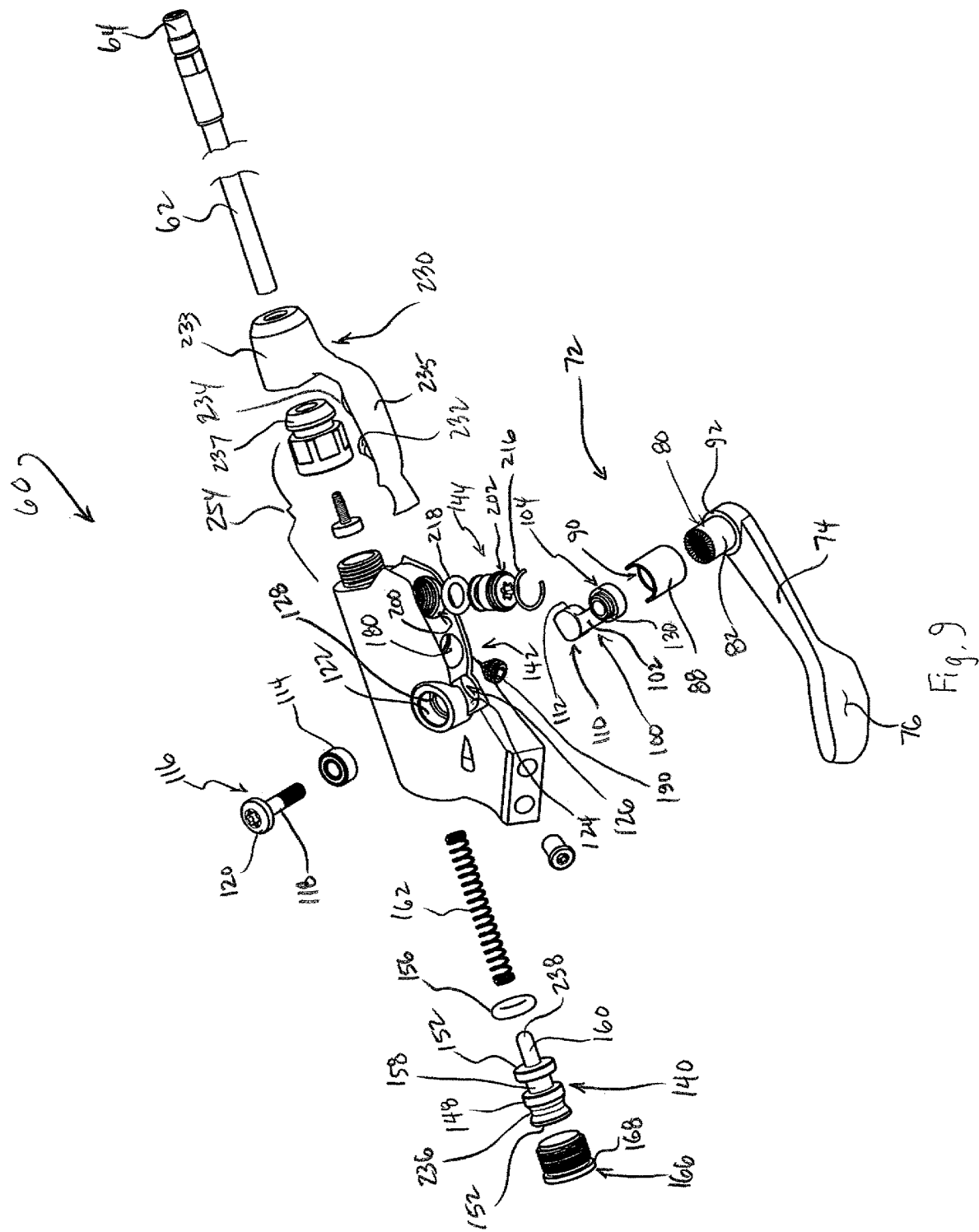

HYDRAULIC BICYCLE COMPONENT CONTROL DEVICE

BACKGROUND

1. Field of the Disclosure

The present disclosure is generally directed to hydraulic valve bicycle components, and more particularly to a control device for operating a hydraulic valve bicycle component.

2. Description of Related Art

Bicycles are known to employ components that employ one or more hydraulic valves to trigger actions such as switching between operational states and/or orientations. Such components may include suspension components, hydraulic drivetrains, hydraulic seat posts or dropper posts, and the like. These types of components can be operated using a control device such as an electronic actuator, a wireless actuation system, or a mechanical or manual actuator. Various systems and actuators of these types are known in the art.

In one example, a hydraulic dropper post for a bicycle seat may be actuated using a control device in the form of a mechanical or manual actuator. The control device is often mounted on the bicycle handlebars. These types of dropper posts utilize a fluid system within the dropper post to raise and lower the seat of the bicycle. In a typical system, when the control device is actuated, the system permits adjustment of the seat and dropper post height. The seat will automatically rise when the control device is actuated and if the rider is not sitting on the seat, i.e., if the weight of the rider is not applying sufficient downward pressure on the seat to prevent the dropper post from extending upward. The seat can be lowered when the control device is actuated and if the weight of the rider is used to push down on the seat, i.e., the rider uses their weight to retract the dropper post downward. When the control device is not actuated, the typical system is designed to maintain a selected seat and dropper post height.

Some of these systems employ a mechanical or manual control device. In one example, the control device is mounted to the bicycle handlebars and has a button or linear plunger for actuating the system. The control device is typically mounted on top of or above the handlebars, which can make access to the actuator ergonomically awkward, particularly with a rider's hand still holding onto the handlebars. The plunger is typically pushed into a housing by the rider's thumb. Depressing the plunger into the housing typically moves a piston within the housing. Movement of the piston pushes hydraulic fluid to operate the dropper post, such as by opening a valve in the system. In these types of actuators, the plunger and piston often are aligned and move along the same linear axis. This results in the plunger either being difficult to push, having to travel a lengthy distance, and/or being difficult to reach and depress without the rider having to alter their grip on the handlebars. Thus, the typical mechanical or manual control device may be difficult to operate for many riders. Further, how fast or slow the seat rises or falls depends on how far the plunger is pushed into the housing of the control device. Awkward ergonomics and linear actuation can make it difficult for a rider to control the degree to which the plunger is pushed or depressed. This in turn can make it difficult for the rider to control the speed of adjusting the seat height.

Another problem with existing manual or mechanical control devices is that they are difficult to bleed. This is because, in order to access the bleed screw or bleed port, one typically has to first disassemble at least part of the control device. Yet another problem with existing mechanical or manual control devices is that the actuation portion, such as the plunger, is typically a one-size-fits-all arrangement. Thus, the ergonomics of the actuation portion are typically not designed to accommodate a range of hand and thumb sizes for different riders. Still another problem with existing manual or mechanical control devices is that, as noted above, the control device does not easily accommodate controlled or easy manipulation of the plunger to selectively actuate the hydraulic component to which the control device is attached. This is because the control device is typically not designed to allow for easy manipulation of the degree of actuation of the control device or the hydraulic valve component.

SUMMARY

In one example, according to the teachings of the present disclosure, a control device for a hydraulic valve bicycle component is disclosed and includes a housing defining a fluid port in fluid communication with a hydraulic valve of a bicycle component. A lever of the control device has a proximal end coupled to the housing and a distal end. The proximal end of the lever is rotatable about a pivot axis. The lever includes an actuation surface near the distal end. A cavity is disposed within the housing. The cavity includes a fluid chamber in fluid communication with the fluid port. A piston is disposed within the cavity and is movable along a piston axis by actuation of the lever. The piston has a piston head and a seal element creating a seal between the piston head and a surface of the cavity. A first plane perpendicular to the pivot axis and containing the piston axis is offset a distance from a second plane perpendicular to the pivot axis and extending through the actuation surface of the lever.

In one example, the piston axis can be non-parallel to the pivot axis.

In one example, the piston axis, the first plane, and the second plane can be perpendicular to the pivot axis.

In one example, the actuation surface of the lever can be spaced a radial distance from the pivot axis. The lever can extend radially relative to the pivot axis and can be actuable to pivot the lever about the pivot axis.

In one example, the actuation surface of the lever can be positioned and arranged to rotate beneath the housing without contacting the housing when the control device is installed on a bicycle.

In one example, the control device can include a drive arm operatively coupled to the lever. The drive arm can have a drive end configured to move the piston along the piston axis.

In one example, the piston can be slidably received in a piston cylinder defined within the cavity. The piston can have a first axial end facing away from the fluid chamber and can have a second axial end facing and exposed to the fluid chamber.

In one example, the seal can be positioned on the piston head between a first axial end and a second axial end of the head. The first axial end can be on one end of the piston head and the second axial end can be on another end of the piston head opposite the first axial end.

In one example, the control device can include a drive arm having a driven end operatively coupled to the lever and having a drive end opposite the driven end. The driven end can be rotatable in concert with the lever about the pivot axis. The drive end can contact a first axial end of the piston to move the piston along the piston axis in a direction to reduce a volume of the fluid chamber to push fluid out the fluid port.

In one example, the control device can include a drive arm having a driven end operatively coupled to the lever and having a drive end opposite the driven end. The driven end can be rotatable in concert with the lever about the pivot axis. The drive end can be configured to move the piston along the piston axis in a first direction reducing a volume of the fluid chamber and pushing fluid out the fluid port.

In one example, the control device can include a drive arm extending radially relative to the pivot axis. The drive arm can have a driven end operatively coupled to the lever. The drive arm can be rotatable about the pivot axis and can have a drive end configured to move the piston in one direction along the piston axis. An angular position of the lever relative to an angular position of the drive arm can be selectively adjustable about the pivot axis.

In one example, the control device can include a shank on the proximal end of the lever. The shank can be concentric with the pivot axis. The control device can include a sleeve concentric with the shank. The sleeve can have a slot formed into one end of the sleeve. The slot can have a width in a circumferential direction around the sleeve. The control device can also have a drive arm operatively coupled to the shank along the pivot axis. The drive arm can extend radially relative to the pivot axis and through the slot of the sleeve. The drive arm can be rotatable about the pivot axis within a range of motion limited by the width of the slot. The drive arm can be configured to move the piston in one direction along the piston axis.

In one example, the control device can have a shank on the proximal end of the lever. An end of the shank can face a drive arm. The end of the shank and a face of a portion of the drive arm facing the shank can be formed having interlocking surface features in contact with one another within a sleeve on the shank.

In one example, the control device can include a bearing positioned along the pivot axis concentric with a shank on the proximal end of the lever. A portion of a drive arm can be sandwiched between the bearing and the shank within a sleeve on the shank.

In one example, the control device can include a bore through the housing. A shank on the proximal end of the lever can extend into one end of the bore and into a sleeve. A fastener can extend through an opposite end of the bore. The fastener can be secured to the shank through the bearing and through a portion of a drive arm.

In one example, the control device can include a biasing element received in the fluid chamber and configured and arranged to bias the piston in a direction away from the fluid port of the housing. Actuation of the lever, through contact with a first axial end of the piston, can move the piston in a direction toward the fluid port.

In one example, the control device can include a biasing element, such as a spring, that is in contact with a second axial end of the piston to bias the piston in a direction away from the fluid port in the housing.

In one example, the piston can have a stem extending from a second axial end of the piston. A biasing element, such as a coil spring can be seated around the stem and can bias the piston in a direction away from the fluid port in the housing. The stem can have a domed or rounded free distal end shape.

In one example, the control device can include a bleed port in the housing in fluid communication with the fluid chamber. The control device can also include a bleed screw accessible in the bleed port. The bleed screw can be selectively adjustable between a closed position sealing off the bleed port and an open position permitting fluid to escape the fluid chamber through the bleed port.

In one example, the control device can include a bleed screw that is accessible from outside of the housing when the control device is installed on a bicycle.

In one example, the control device can include a volume adjustment mechanism having an opening in the housing in communication with the fluid chamber. The volume adjustment mechanism can include a fluid reservoir in fluid communication with the fluid chamber. The volume adjustment mechanism can include an adjustment screw received in the opening. The adjustment screw can be movable within the opening to selectively vary an adjustable volume of the fluid reservoir, which can selectively vary a chamber volume of the fluid chamber.

In one example. the control device can include a volume adjustment having an opening in the housing in communication with the fluid chamber and having an adjustment screw received in the opening. The adjustment screw can be movable within the opening to selectively vary a chamber volume of the fluid chamber.

In one example, according to the teachings of the present disclosure, a control device for a hydraulic valve bicycle component has a housing defining a fluid port in fluid communication with a hydraulic valve bicycle component. The control device includes a lever having a proximal end pivotally coupled to the housing and having a distal end. The lever is pivotable about a pivot axis and has an actuation surface near the distal end. The control device has a cavity within the housing. The cavity includes a fluid chamber in fluid communication with the fluid port. The control device also has a volume adjustment mechanism, which includes an opening in the housing in communication with the fluid chamber and an adjustment screw received in the opening and accessible from an outside of the housing. The adjustment screw is movable to selectively vary a chamber volume of the fluid chamber.

In one example, the volume adjustment mechanism can include a fluid reservoir in fluid communication with the fluid chamber. The adjustment screw can be movable to selectively vary a reservoir volume of the fluid reservoir, which can vary the chamber volume of the fluid chamber.

In one example, the volume adjustment mechanism can include a groove around an interior surface of the opening outboard of the adjustment screw and a snap ring received the groove to inhibit the adjustment screw from being backed completely out of the opening.

In one example, the volume adjustment mechanism can include an O-ring received in a ring groove around an outer circumference of the adjustment screw. The O-ring can be arranged to create a seal between a wall of the opening and the adjustment screw.

In one example, the adjustment mechanism can include a fluid reservoir within the opening and inboard of a free end of the adjustment screw. The fluid reservoir can be fluid communication with the fluid chamber. The adjustment screw can be movable to selectively vary a reservoir volume of the fluid reservoir, which can vary the chamber volume of the fluid chamber. The fluid reservoir can have a first diameter within the opening and can have a flow hole between the fluid chamber and the fluid reservoir. The flow hole can have a second diameter smaller than the first diameter.

In one example, the control device can include a removable boot on the housing. The removable boot can cover at least a portion of the housing including the adjustment screw and the opening of the volume adjustment mechanism.

In one example, the control device can include a bleed port in the housing in fluid communication with the fluid chamber and a bleed screw accessible in the bleed port for selectively opening and sealing the bleed port. The bleed screw can be accessible outside of the housing when the control device is installed on a bicycle.

In one example, the control device can include a removable boot on the housing. The removable boot can cover at least a portion of the housing including the adjustment screw and the opening of the volume adjustment mechanism and a bleed screw and a bleed port on the housing.

In one example, the control device can include a piston disposed within the cavity and movable along a piston axis. The piston axis can be spaced a distance from the pivot axis.

In one example, according to the teachings of the present disclosure, a control device for a hydraulic valve bicycle component has a housing defining a fluid port in fluid communication with a hydraulic valve of a bicycle component and has a lever having a proximal end coupled to the housing and a distal end. The proximal end of the lever is rotatable about a pivot axis. The lever has an actuation surface near the distal end. The control device has a cavity within the housing. The cavity includes a fluid chamber in fluid communication with the fluid port. The control device has a piston disposed within the cavity and movable along a piston axis by actuation of the lever. The piston has a piston head and a seal element creating a seal between the piston head and a surface of the cavity. The pivot axis is offset a distance from the piston axis.

In one example, according to the teachings of the present disclosure, a control device for a hydraulic valve bicycle component a housing defining a fluid port in fluid communication with a hydraulic bicycle component and a lever having a proximal end coupled to the housing and a distal end. The lever is pivotable at the proximal end about a pivot axis and has an actuation portion near the distal end. The control device has a cavity within the housing. The cavity includes a fluid chamber in fluid communication with the fluid port. A bleed port is provided in the housing in fluid communication with the fluid chamber and a bleed screw is accessible in the bleed port for selectively opening and sealing the bleed port. The bleed screw is accessible on the outside of the housing when installed on a bicycle for use.

In one example, the lever does can be arranged so as not to overlie the bleed screw.

In one example, the bleed port and the bleed screw can be accessible on the housing without having to disassemble any portion of the lever.

In one example, the control device can include a piston disposed within the cavity and movable along a piston axis. The piston axis can be arranged so as not to intersect the pivot axis.

In one example, the control device can include a piston disposed within the cavity and movable along a piston axis. The piston axis can be generally perpendicular to but offset from the pivot axis.

In one example, the bleed screw can have a seal surface that contacts a seat within the bleed port in a closed position and that is not in contact with the seat in an open position.

In one example, the bleed screw can have a seal surface that contacts a seat within the bleed port in a closed position. The seal surface and the seat can both be metal surfaces.

BRIEF DESCRIPTION OF THE DRAWINGS

Objects, features, and advantages of the present invention will become apparent upon reading the following description in conjunction with the drawing figures, in which:

FIG. 3 is a cross-section taken along line 3-3 of portions of the dropper post and control device of FIG. 2.

FIGS. 4A and 4B show top and bottom perspective views, respectively, of the control device of FIG. 2 and mounted to the handlebars of the bicycle of FIG. 1.

FIG. 5 is a top view of the control device of FIG. 2.

FIG. 6 is a side view of the control device of FIG. 5.

FIG. 9 is an exploded perspective view of the control device of FIG. 5.

DETAILED DESCRIPTION OF THE DISCLOSURE

Figure 1:
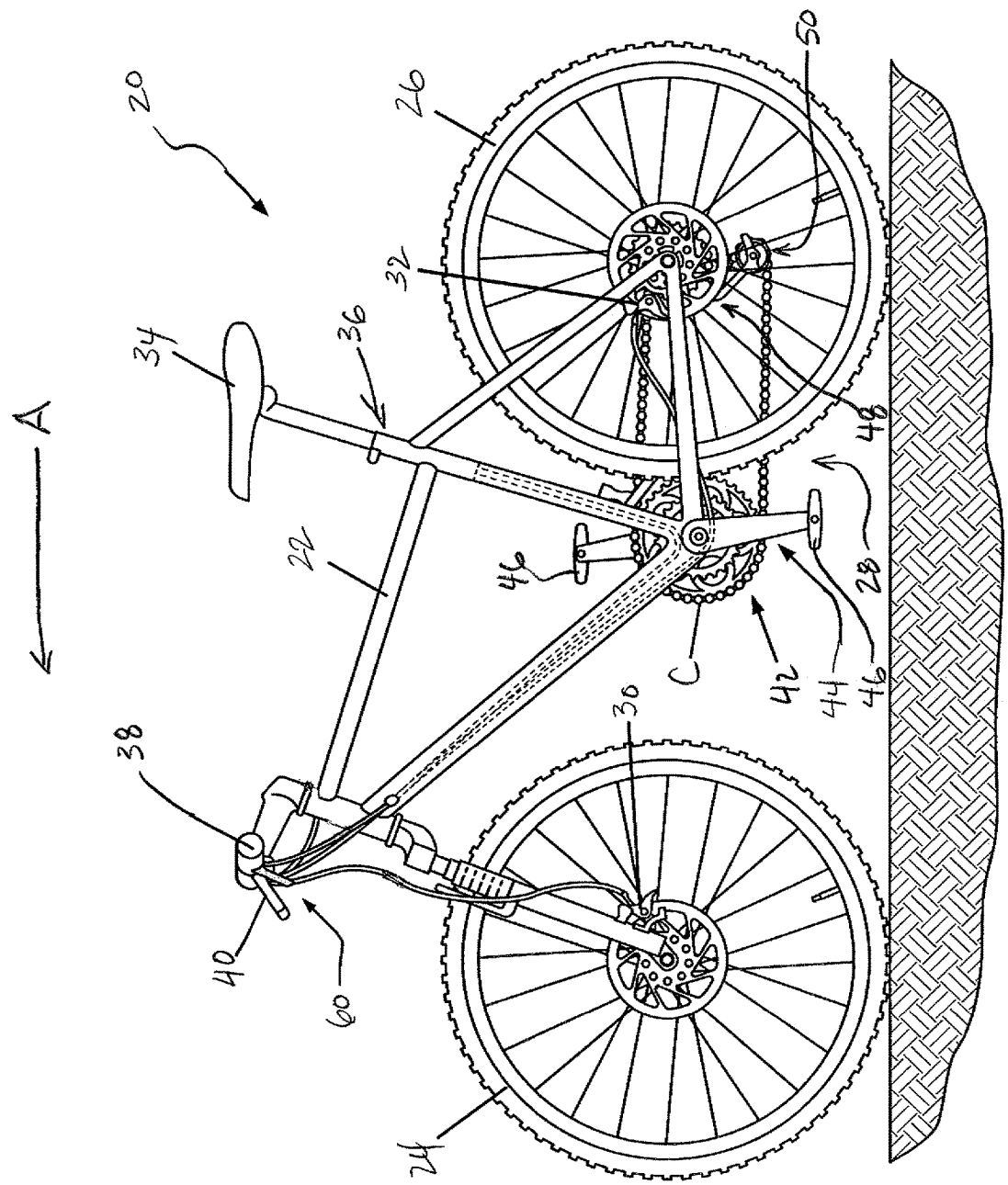
FIG. 1 is a side view of one example of a bicycle, which may have a hydraulic valve component that utilizes a control device constructed in accordance with the teachings of the present disclosure.

The present disclosure provides examples of control devices for and bicycle hydraulic components that solve or improve upon one or more of the above-noted and/or other problems and disadvantages with prior known control devices. The disclosed control devices can replace existing manual or mechanical control devices for bicycle hydraulic components. One advantage of the disclosed control devices is that the bleed screw or bleed port is readily accessible without having to disassemble either the actuation mechanism or any other significant part of the control device. This is, in part, because the control devices can be mounted on the under-bar side of the handlebars. A further advantage of the disclosed control devices is that the under-bar mounting location results in improved ergonomic positioning and thus easier actuation of the control devices. Another advantage of the disclosed control devices is that the starting position of the actuation mechanism is adjustable to accommodate a wide range of rider hand sizes. Yet another advantage of the disclosed control devices is that a delay or lag in the operation of the control device, and thus the hydraulic valve component, can be both controlled through operation of the actuation mechanism and adjusted via a volume adjustment mechanism and feature.

These and other objects, features, and advantages of the disclosed control devices will become apparent to those having ordinary skill in the art upon reading this disclosure. Throughout the drawing figures, where like reference numbers are used, the like reference numbers represent the same or substantially similar parts among the various disclosed examples. Also, specific examples are disclosed and described herein that utilize specific combinations of the disclosed aspects, features, and components of the disclosure. However, it is possible that each disclosed aspect, feature, and/or component of the disclosure may, in other examples not specifically disclosed or described herein, be used independent of or in different combinations with other of the aspects, features, and components of the disclosure.

Turning now to the drawings, FIG. 1 generally illustrates a bicycle 20, which may employ a control device constructed in accordance with the teachings of the present disclosure. The bicycle 20 includes a frame 22, a front wheel 24 and a rear wheel 26 each rotatably attached to the frame, and a drivetrain 28. A front brake 30 is provided for braking the front wheel 24 and a rear brake 32 is provided for braking the rear wheel 26. The bicycle 20 also generally has a seat 34 near a rear end of the frame 22 and carried on an end of a seat tube, i.e., in this example, a dropper post 36 that is connected to the frame. The bicycle 20 also has handlebars 38 near a forward end of the frame 22. A brake lever 40 is carried on the handlebars 38 for actuating one of the front brake 30 or rear brake 32, or both. If the brake lever 40 is for actuating only one of the front or rear brakes 30, 32, a second brake lever (not shown) may also be provided to actuate the other brake. A front and/or forward riding direction or orientation of the bicycle 20 is indicated by the direction of the arrow A in FIG. 1. As such, a forward direction of movement for the bicycle 20 is indicated by the direction of arrow A.

While the illustrated bicycle 20 depicted in FIG. 1 is a mountain bike having flat style handlebars 38, the present disclosure may be applicable to handlebars of any type, such as riser bars for mountain bikes or drop-style for road bikes. The present disclosure may also be applicable to bicycles of any type, including mountain bikes with full or partial suspension, as well as bicycles with mechanically controlled (e.g. cable, hydraulic, pneumatic) and non-mechanical controlled (e.g. wired, wireless) drive systems.

The drivetrain 28 has a chain C and a front sprocket assembly 42, which is coaxially mounted with a crank assembly 44 having pedals 46. The drivetrain 28 also includes a rear sprocket assembly 48 coaxially mounted with the rear wheel 26 and a rear gear change mechanism, such as a rear derailleur 50. Further details of the drivetrain 28 are not shown or described herein, as the drivetrain is limited relevance to the control devices as disclosed and described herein.

Figure 2:
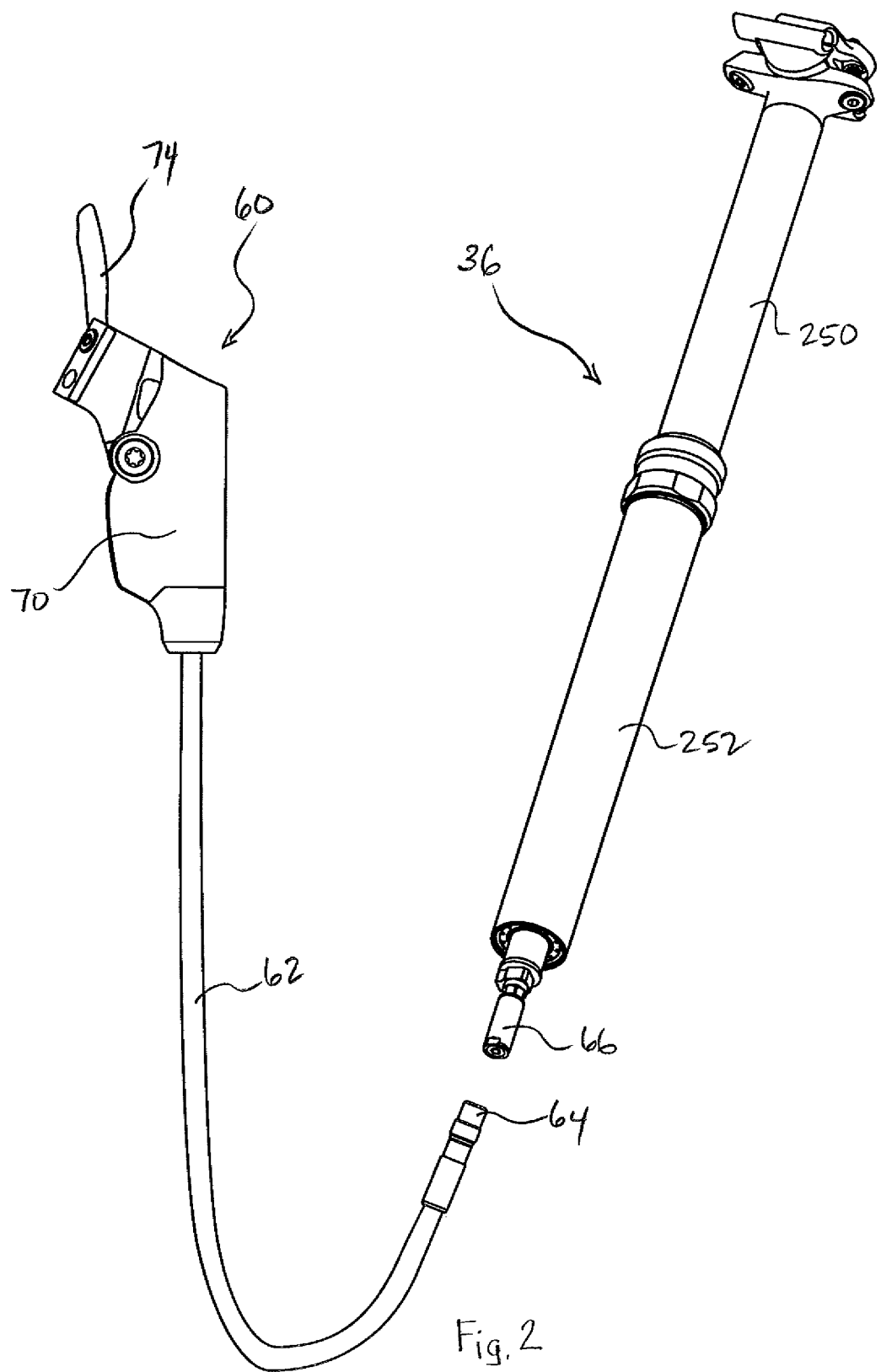
FIG. 2 is a perspective view of one example of a hydraulic dropper post and a control device of the bicycle depicted in FIG. 1.

Referring to FIGS. 1 and 2, the bicycle 20 has a control device 60 constructed in accordance with the teachings of the present disclosure. The control device in this example is configured for actuating or operating a bicycle component having a hydraulic valve (not shown). As noted above, and as depicted in FIG. 2, the bicycle component may be a mechanically and/or hydraulically actuated dropper post 36. The control device 60 is coupled to the dropper post 36 in this example via a hydraulic fluid line 62 and a quick disconnect fitting or coupling. The fluid line 62 has a first end connected to the control device 60 at a connection that is intended to be permanent, i.e., not readily disconnected under normal circumstances. A male part 64 of the quick disconnect fitting is carried on an opposite second end of the fluid line 62 in this example. The male part 64 can be connected to a female part 66 of the quick disconnect fitting that is carried on a bottom end of the dropper post 36 in this example. Other types of connections can be utilized to join the fluid line 62 to both the control device 60 and the dropper post 36. Likewise, the male and female parts 64, 66 of the quick disconnect fitting can be swapped between the control device 60 and the dropper post 36, if desired. The particular construction, function, and operation of the dropper post 36 is known in the art and will not be described further herein, except for further below in describing the function and operation of the control device 60.

Figure 4B:
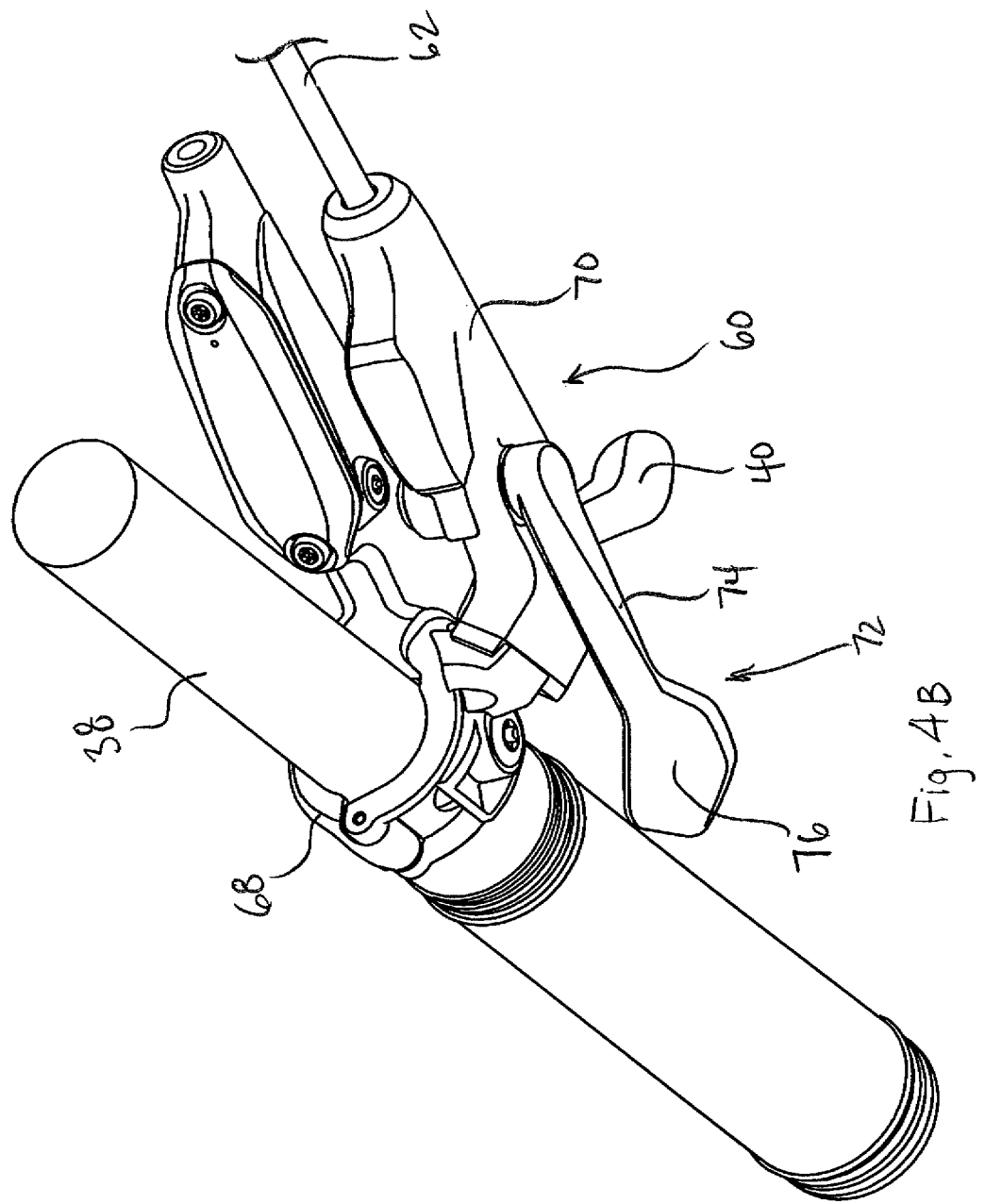

Referring to FIGS. 4A and 4B, the control device 60 can be mounted to a portion of the handlebars 38. In one example, the control device 60 can be attached to the handlebars 38 with a standard ring clamp or clasp, which can be a stand-alone clamp just for the device. However, as depicted herein, the control device 60 can be mounted to the handlebars 38 using a position adjustable clamp 68, which may carry multiple devices for attachment to the bicycle. In this example, the position adjustable clamp 68 is used to attach the brake lever 40 and the control device 60 to the handlebars 38. As discussed further below, the control device 60 is configured to permits mounting the device under-bar on the handlebars 38. This mounting position creates advantages over existing control device solutions.

FIGS. 4A and 4B show perspective views of the control device 60 mounted under-bar on the handlebars 38. FIG. 5 shows a top view and FIG. 6 shows an end view of the control device 60 detached from the bicycle 20. In this example, the control device 60 generally has a housing 70 and an actuation mechanism 72 for actuating or operating the control device. The housing 70 may be made from any suitable material, such as a metal, ceramic, plastic, thermoplastic, or composite, and may be made using any suitable manufacturing techniques. The housing 70 may be a one-piece construction that is machined, molded, cast, or the like. The housing 70 instead may be a two-piece construction or a multiple part construction, with the pieces or parts fastened together. These pieces or parts can also be formed of any suitable material and using any suitable manufacturing method. In one example, the housing 70 may be made from aluminum, such as a 6000 Series aluminum alloy.

The actuation mechanism 72 has a lever 74 that extends from the housing 70. The lever 74 has a proximal end connecting the lever to the housing 70 and has a distal or free end. The actuation mechanism 72 can be actuated by a rider pressing their thumb against an actuation surface 76 on a face of the lever 74 that is directed toward the rider and that is near the distal end. The rider can press on the actuation surface 76 in the direction of the arrow T shown in FIGS. 4A-6 to actuate the actuation mechanism 72 and operate the control device 60, as described further below. The lever 74 can also be made from any suitable material and using any suitable manufacturing technique, such as machining, molding, casting, or the like. For example, the lever can be formed of aluminum, steel, sintered metal, plastic, thermoplastic, composite, or the like. In one example, the lever 74 is formed of a metal material.

Figure 7A:
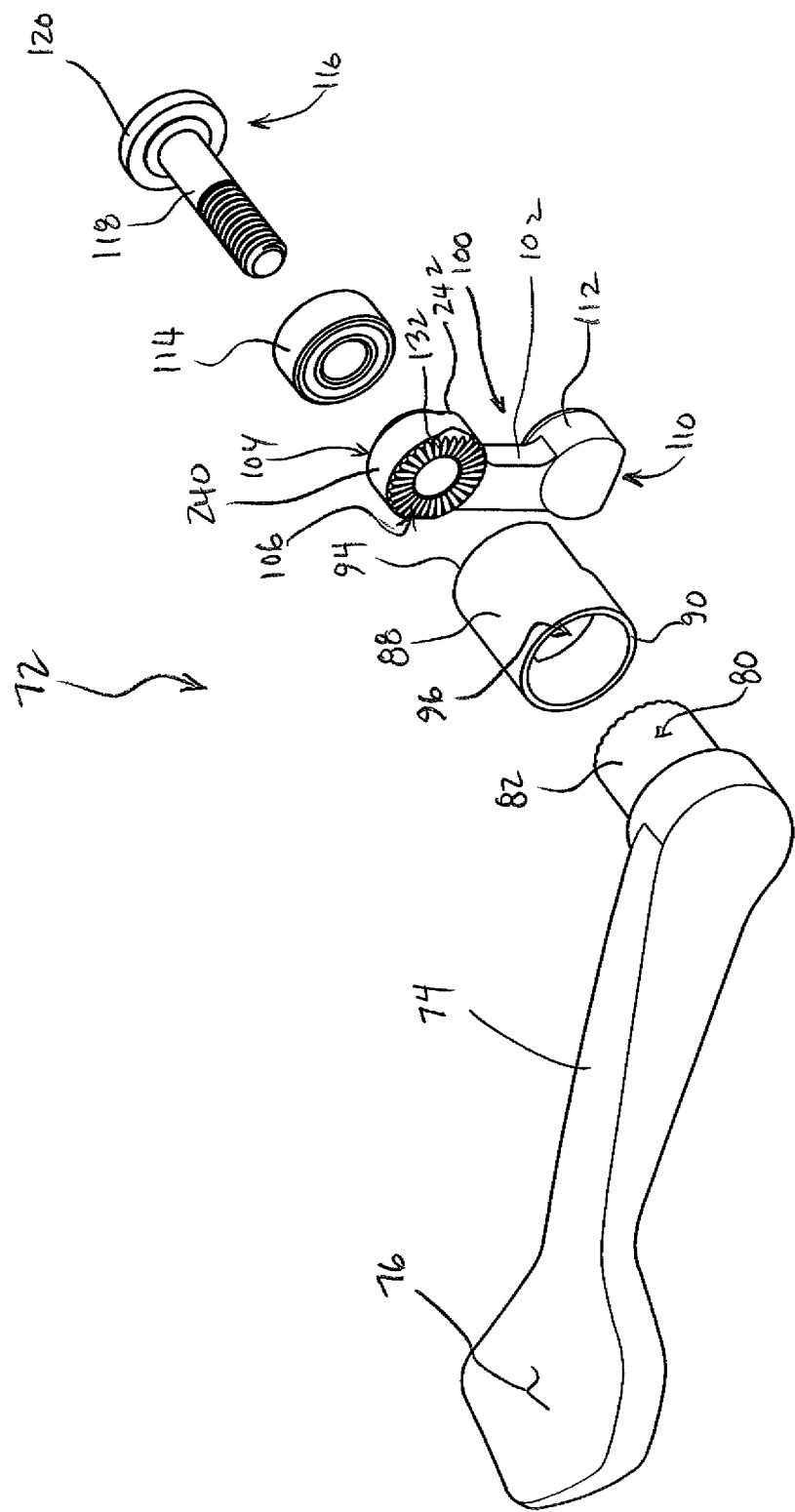
FIGS. 7A and 7B are bottom and top perspective exploded views, respectively, of an actuation mechanism of the control device of FIGS. 5 and 6.
Figure 7B:
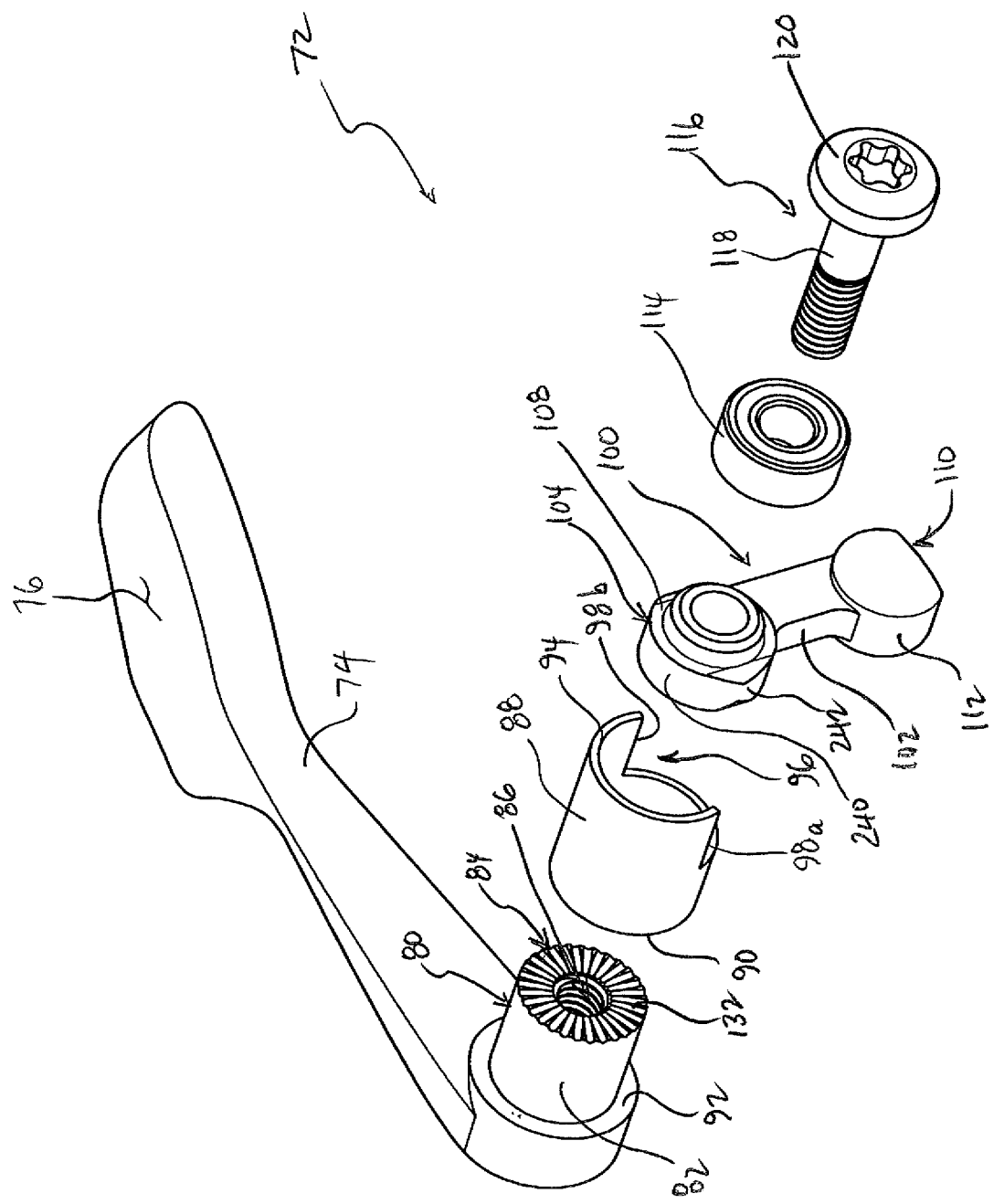

Referring to FIGS. 7A and 7B, the parts of the actuation mechanism 72 are shown and described. In this example, the actuation mechanism 72 includes a shank 80 that extends from the proximal end of the lever 74. The lever 74 is an elongate element that extends away from the shank 80. The shank 80 has a cylinder shape defining a circumferential outer surface 82. The shank 80 has one end joined to the lever 74. In one example, the shank 80 can be an integral part of the lever 74 and can be formed therewith from the same material. The shank 80 has an opposite end that terminates in an exposed end face 84. A blind bore 86 is formed into the end face 84. Female mechanical threads are formed within the blind bore 86 in this example. The shank 80 defines a pivot axis P oriented lengthwise relative to the shank.

The actuation mechanism 72 also has a bushing or sleeve 88. The sleeve 88 is also cylinder shaped and has a first end 90 that is configured to lie adjacent a shoulder 92 around the one end of the shank 80 on the proximal end of the lever 74. The sleeve 88 also has a second end 94 opposite the first end 90. The second end 94 faces away from the lever 74 and, in this example, has a slot 96 or notch formed into the second end to a depth that is less than a full length of the sleeve. The slot 96 also extends only partially around the sleeve 88 and thus has a width in the circumferential direction. The width of the slot 96 is defined between two terminal ends 98a, 98b of the slot. The sleeve or bushing 88 can be formed of any suitable material, such metal, plastic, thermoplastic, composite, or the like. In one example, the sleeve or bushing 88 is formed of an engineered thermoplastic material, for example an acetal homopolymer resin such as DELRIN® by DUPONT.

The actuation mechanism 72 also has a drive arm 100 that extends radially outward relative to the pivot axis P. The drive arm 100 has a body 102 with a driven end 104 at a proximal end of the body. The driven end 104 is formed as a ring arranged concentric with the pivot axis P and with a central opening. The ring shaped driven end 104 has one face 106 that faces toward the lever 74 and an opposite face 108 that faces way from the lever. The drive arm 100 also has a drive end 110 at a distal end of the body 102. The drive end 110 is a puck-shaped element, at least in part, in this example. The puck-shaped element or drive end 110 is connected to or carried on the distal end of the body 102 and is configured to define an exposed, curved, contact surface 112 around a portion of the perimeter of the puck-shaped element. The drive arm 100 can also be made from any suitable material and using any suitable manufacturing technique. The drive arm can be machined, molded, cast, or the like from a metal, plastic, thermoplastic, composite, or the like. In one example, the drive arm 100 can be formed of steel.

The actuation mechanism 72 also has a friction reducing device configured to facilitate rotation in the form of a ring-shaped bearing 114 positioned adjacent the opposite face 108 of the driven end 104 of the drive arm 100. The bearing 114 can be a ball bearing or another suitable type of bearing or friction reducing bushing. The bearing 114 has a central opening and is also arranged concentric with the pivot axis P. A fastener or bolt 116 has a stem 118 and a head 120. The stem 118 is aligned concentric with the pivot axis P. The bolt 116 includes male mechanical threads around a distal portion of the stem 118. The head 120 has a diameter that is larger than the diameter of the central opening in the bearing 114.

Figure 8:
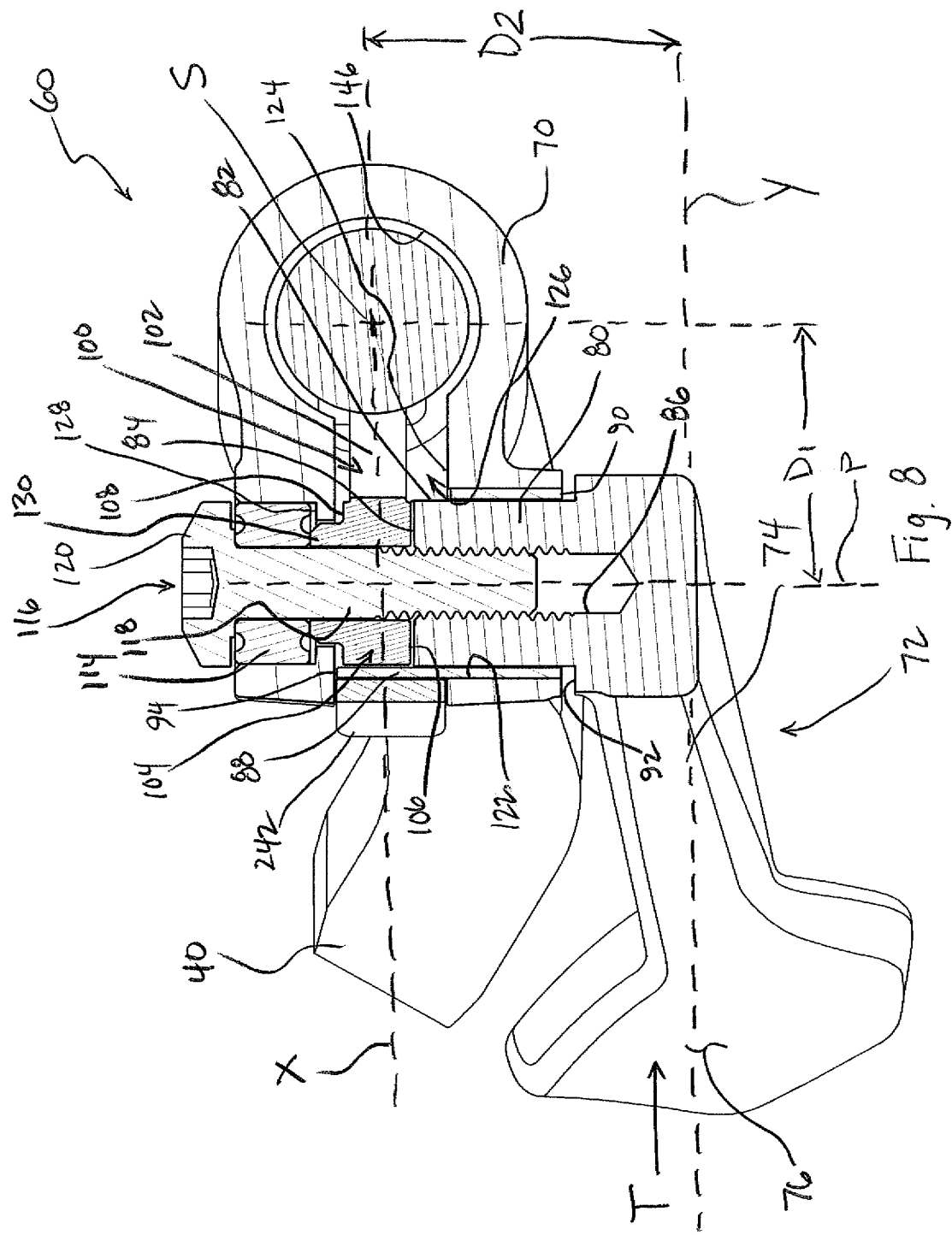
FIG. 8 is a cross-section taken along line 8-8 of the control device of FIG. 5 and showing the assembled actuation mechanism of FIGS. 7A and 7B.

Referring to FIG. 8, the assembled actuation mechanism 72 is depicted relative to the housing 70. In this example, a through-bore 122 is formed through the housing 70 and is oriented generally vertically (referring to the installed and in-use position of the control device 60 of FIGS. 4A and 4B). A lateral bore 124 is also formed across, but not all the way through, the housing 70, and intersecting and extending beyond the through-bore 122. The housing 70 defines a cavity 126 therein, and the lateral bore 124 may be considered as part of the cavity. The drive arm 100 is received in the lateral bore 124, drive end 110 first, across the through-bore 122 until the central opening of the ring on the driven end 104 is aligned with the through-bore. The sleeve 88 is received over the outer surface 82 on the shank 80. The slot 96 of the sleeve 88 is oriented to face the cavity and is arranged to provide rotational clearance for the drive arm 100. The shank 80 and sleeve 88 are received in the lower end of the through-bore 122.

The circumferential portion of the sleeve 88 near the first end 90 lies between the outer surface of the shank 80 and the inner surface of the housing 70 that defines the through-bore 122. The sleeve or bushing 88 thus prevents direct surface-to-surface contact between the housing 70 and the shank 80, such as steel-to-aluminum contact in this disclosed example, reducing the friction of relative movement between the housing 70 and the shank 80. The portion of the sleeve 88 that is opposite the slot 96 lies between the surface of the housing 70 within the through-bore 122 and the driven end 104 of the drive arm 100. This portion of the sleeve 88 thus prevents direct surface-to-surface contact between the driven end 104 of the drive arm and the housing 70, such as steel-to-aluminum contact in this example. The bearing 114 is received in the upper end of the through-bore 122. The stem 118 of the bolt 116 extends into the upper end of the through-bore 122, through the central openings of the bearing 114 and the ring of the driven end 104, and into the blind bore 86 of the shank 80. The mechanical threads on the stem 118 and in the blind bore 86 engage one another and the bolt can be tightened to clamp the components of the actuation mechanism 72 together.

The features and dimensions of the various parts of the actuation mechanism 72 can be such that the bolt 116 can be tightened to clamp the parts together while not clamping down on the housing 70, thus permitting rotation of the lever 74 during use. In this example, the bearing 114 is borne against a shoulder 128 formed within the upper end of the through-bore 122. The shoulder 128 thus defines the axial position of the bearing within the through-bore 122. The ring of the driven end 104 has an upward protruding annular rib 130 of a diameter small enough to fit within the diameter of the shoulder 128. The annular rib 130 bears against the bottom of the bearing 114. When the bolt 116 is tightened, the shank 80 is clamped tightly to the ring of the driven end 104, the rib 130 is clamped to the bearing 114, and the head 120 of the bolt is clamped tightly to the top of the bearing. Referring to FIG. 8, the shoulder 92 on the lever 74 adjacent the shank 80 and the head 120 of the bolt 116 loosely capture the housing 70 therebetween, allowing rotational movement of the lever when the bolt is tightened.

Referring to FIGS. 7A and 7B, the one face 106 on the ring of the driven end 104 and the end face 84 on the shank 80 can each be provided with mating or corresponding surface features 132 to rotationally lock the lever 74 to the drive arm 100. However, in this example, these features 132 can also permit relative angular adjustment between the lever 74 and the drive arm 100. In other words, with the bolt 116 loosened, the lever 74 may be rotated about the pivot axis relative to the drive arm 100 to change their relative angular position. The surface features 132 on these two mating surfaces 84 and 106 can be configured to interlock with one another, when the bolt is tightened, in a range of orientations, for reasons discussed further below. In one example, each of the end face 84 on the shank 80 and the one face 106 on the driven end 104 can include knurling on their respective surfaces wherein the knurling on each surface can engage the other in multiple different rotational or angular positions. The type of surface feature or features 132 can vary within the scope of the disclosure and yet function as intended.

Figure 10A:
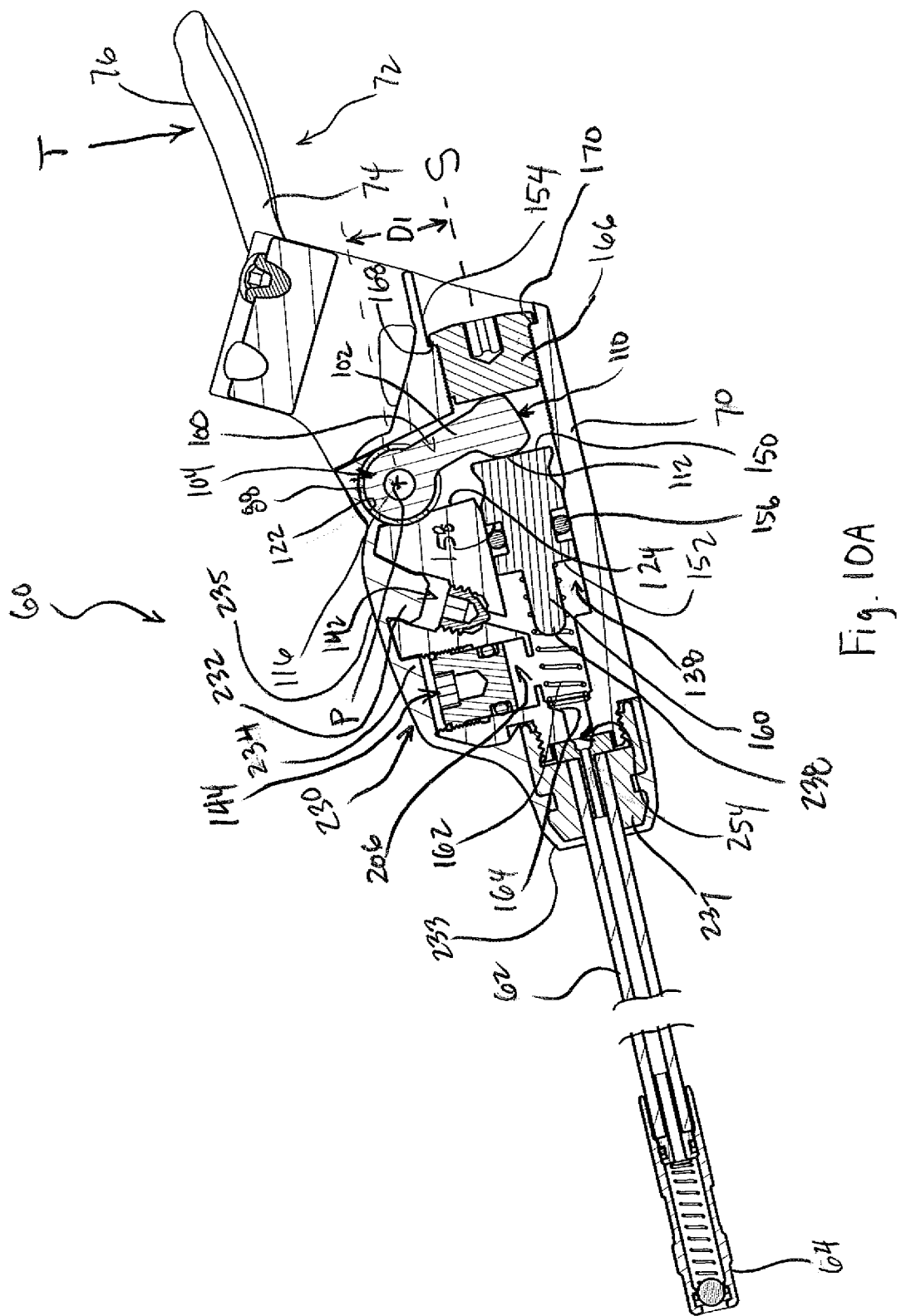
FIG. 10A is a cross-section taken along line 10-10 of the control device shown in FIG. 6.
Figure 10B:
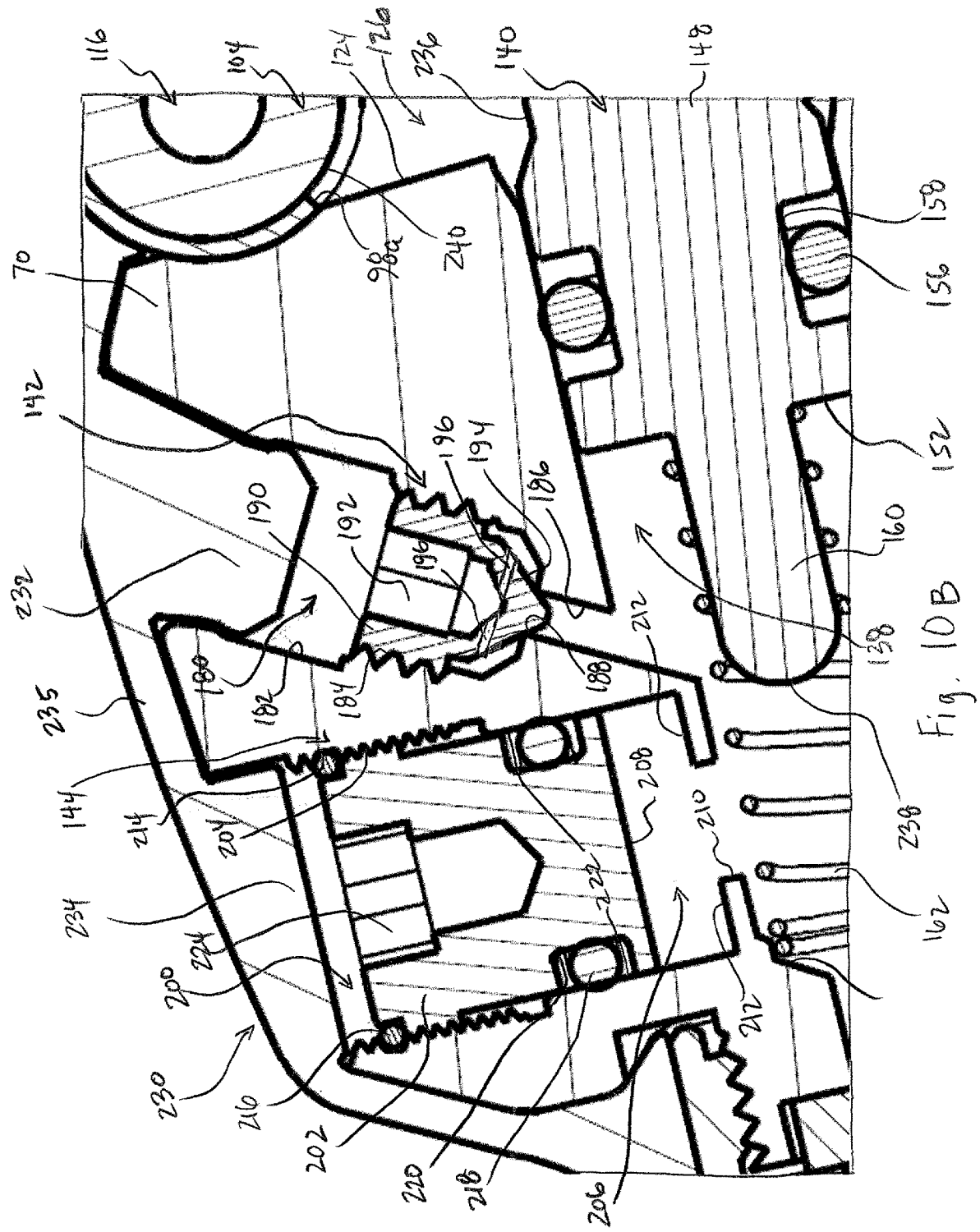
FIG. 10B is an enlarged portion of the control device shown in FIG. 10A and depicts a bleed device and a volume adjustment mechanism thereof.
Figure 11:
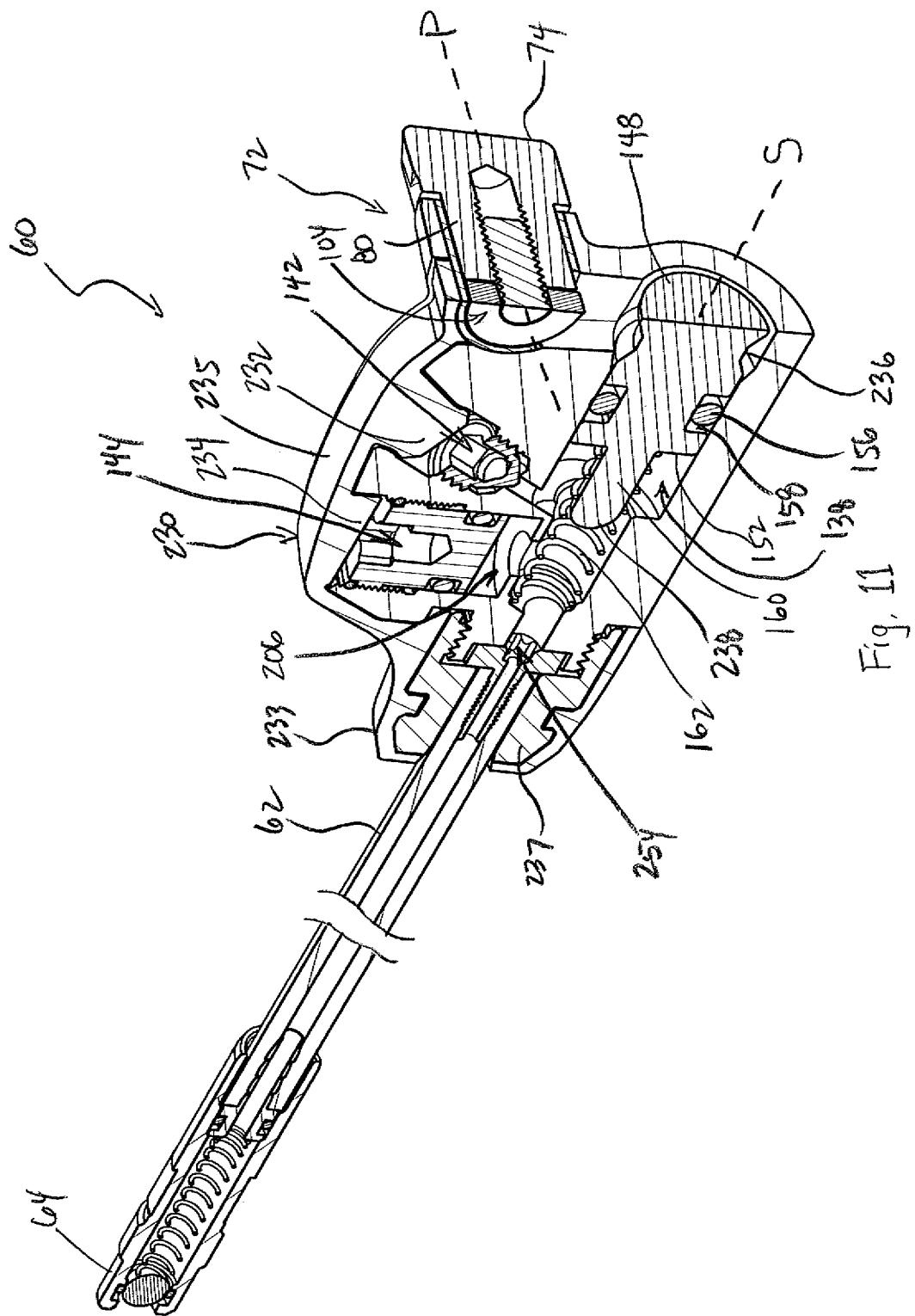
FIG. 11 is a cross-section taken along line 11-11 of the control device shown in FIG. 5.

Referring to FIGS. 9-11, the remaining parts of the control device 60 are depicted. In this example, the control device 60 has a fluid chamber 138 defined within the cavity 126 of the housing 70. Several elements of the control device 60 interact or communicate with the fluid chamber 138. In this example, these elements include a piston 140, a bleed device 142, and a volume adjustment mechanism 144. Each of these elements is described below.

The piston 140 is received within a piston cylinder 146 within the cavity 126. In this example, the piston cylinder 146 is cylindrical in cross-section, although the cylinder may be oblong, elliptical, or some other suitable shape. The piston 140 is slidably movable along a piston axis S defined along the center axis of the piston and the piston cylinder 146. The piston 140 has a piston head 148 with a first axial end 150 on the piston head 148 that faces away from the fluid chamber 138. The piston 140 also has a second axial end 152 that faces the fluid chamber 138. The first axial end 150 faces an opening 154 in the housing 70 into the cavity 126. A seal 156 is provided on the piston 140. In this embodiment the seal 156 is an O-ring. The seal 156 may also be a lip seal, cup seal, or other seals suitable for the application involving the movement of fluid through a sealed compression. The O-ring 156 is seated in a groove 158 on the piston head 148 between the two axial ends 150, 152. The O-ring 156 provides a seal between the piston head 148 and the surface of the piston cylinder 146. The piston 140 in this example has a stem 160 protruding axially from the second axial end 152 of the piston head 148. A biasing element, such as a coil spring 162, is received over and supported by the stem 160 and borne at one end against the second axial end 152. The other end of the spring 162 is seated against a fixed stop surface 164 within the fluid chamber 138. The spring 162 biases the piston 140 in a direction away from the fluid chamber 138.

A cap 166 is received in the opening 154 in the housing 70 to close off the cavity 126. The drive end 110 of the drive arm 100 is disposed in the cavity 126 between the cap 166 and the first axial end 150 of the piston 140. The spring 162 will bias the piston 140 into contact with the drive end 110 of the drive arm 100. The drive end 110 will contact the cap 166, the position of which can thus define or determine the starting position or maximum stroke of the piston 140 in the direction away from the fluid chamber 138. In this example, the cap includes a flange 168 extending radially outward. The opening 154 includes a step 170 protruding radially inward from the surface of the cavity within the opening. The position of the cap 166 is thus determined by contact between the flange 168 and the fixed step 170. In one example, this arrangement can define a single, non-adjustable fixed cap position for the cap 166 when installed in the opening 154. In another example, the cap 166 and opening 154 may be threaded or otherwise configured to permit axial adjustment of the position of the cap along the opening. Such an adjustment would allow a user to adjust the starting position or the maximum stroke of the piston 140 in the direction away from the fluid chamber.

Referring to FIG. 10B, the bleed device 142 includes a bleed port 180 in the housing 70 and in fluid communication with the fluid chamber 138. The bleed port 180 is positioned on the housing 70 so that it is accessible when the control device 60 is mounted under-bar on the handlebars 38 of the bicycle 20. The bleed port 180 is also positioned on the housing relative to the lever 74 so that the port is accessible without having to disassemble the lever or to move the lever to clear the bleed port. Thus, as noted further below, a user can bleed the control device 60, as needed, with the device mounted on the bicycle.

In this example, the bleed port 180 has an entry segment 182 adjacent the exterior of the housing 70, the entry segment having a first diameter. The bleed port 180 has a threaded segment 184 inboard of the entry segment and having a second diameter smaller than the first diameter. The threaded segment 184 has female mechanical threads in this example. The bleed port 180 also has a bleed passage 186 between the bleed port and the fluid chamber 138 and providing fluid communication therebetween. The bleed passage 186 has a third diameter that is smaller than the second diameter of the threaded segment. 184. A seat 188 is defined at the juncture between the bleed passage 186 and the threaded segment 184.

The bleed device 142 also has a bleed screw 190 received in the bleed port 180. In this example, the bleed screw 190 has a blind tool engagement hole 192 in one end. The blind tool engagement hole 192 can have a tool engagement shape, such as a hexagonal Allen wrench shape, a Torx head shape, or the like for receiving a working end of a corresponding tool (not shown). An outboard end of the bleed screw 190 has male mechanical threads on the periphery of the screw to engage the female threads within the threaded segment 184 of the bleed port 180. The bleed screw 190 has a tip with a tapered shape defining a sealing surface 194 opposite the threaded end.

In this example, the sealing surface 194 is configured to tightly contact the seat 188 within the bleed port 180 to close off the bleed port, including the bleed passage 186, when the bleed screw is rotated to a closed position. The bleed screw 190 can have one or more cross bores or holes 196 formed between the blind tool engagement hole 192 and the tip of the bleed screw below the outboard segment. When the bleed screw 190 is rotated to an open position, i.e., when the sealing surface 194 is not in contact with the seat 188, fluid can flow from the fluid chamber 138, though the bleed passage 186 and past the seat 188 into the bleed port 180. Fluid can then flow through the cross bores or holes 196 in the tip of the bleed screw 190 into the blind tool engagement hole 192 and can then escape the bleed port 180. In this way, the fluid chamber 138 can be bled without having to remove the bleed screw 190 and without having to remove or disassemble the control device 60.

Referring again to FIG. 10B, the volume adjustment mechanism 144 includes an opening 200 in the housing 70. The opening 200 is in fluid communication with the fluid chamber 138. The volume adjustment mechanism 144 also has an adjustment screw 202 that is received in the opening 200 and that is accessible from an outside of the housing 70, similar to the bleed screw 190. The opening 200 in this example has an outboard portion 204 that has female mechanical threads. The opening 200 also has an inboard portion closer to the fluid chamber 138. In this example, the volume adjustment mechanism 144 can include a fluid reservoir 206 within the opening 200 and inboard of a free end 208 of the adjustment screw 202. The fluid reservoir 206 can be in fluid communication with the fluid chamber 138. The fluid reservoir 206 can have a first diameter within the opening 200 and can have a flow hole 210 created by a flange 212 between the fluid chamber 138 and the fluid reservoir 206. The flow hole 210 can have a second diameter that is smaller than the first diameter of the opening 200.

The adjustment screw 202 can be retained in the opening 200 so that the screw cannot be caked out of the opening. In this example, the volume adjustment mechanism 144 has a groove 214 around an interior surface of the opening 200 and outboard of the female threads and outboard of the adjustment screw 202. A snap ring 216 is received in the groove 214 and is sized to inhibit the adjustment screw 202 from being backed completely out of the opening 200. The adjustment screw 202 in this example has male mechanical threads on the circumferential surface to engage the female threads in the opening 200. An O-ring 218 is received in a ring groove 220 around the outer circumference of the adjustment screw 202. The O-ring 218 can be arranged to create a seal between a surface or wall 222 of the opening 200 and the outer surface of the adjustment screw 202.

In this example, the adjustment screw 202 also has a blind tool engagement hole 224 shaped to receive the working end of a tool (not shown) such as an Allen wrench or a Torx head wrench. The adjustment screw 202 can be movable by rotating the screw to selectively vary the axial position of the screw. Doing so will vary a reservoir volume of the fluid reservoir 206, which can vary the chamber volume of the fluid chamber 138. In another example, there may be no separate fluid reservoir 206. Instead, the screw 202 may be moved to simply reduce or expand the size of the opening inboard of the free end 208 of the screw. Alternatively, the adjustment screw may seat in an opening in the housing and be movable to protrude into or be retracted from the fluid chamber to thereby reduce or expand the chamber volume of the fluid chamber. In any case, in these examples, the adjustment screw is movable to selectively vary the chamber volume of the fluid chamber.

In the disclosed example, the control device 60 can include a removable or displaceable boot 230 or cover fitted to a part of the housing 70. The removable boot 230 can be formed of a flexible or resilient material such as rubber. In this example, the removable boot includes projections 232 and 234 that are received in the bleed port 180 and opening 200, respectively, of the bleed device 142 and volume adjustment mechanism 144. The projections can aid in retaining the removable boot 230 on the housing 70 and in protecting these orifices or access points from contamination. If there is such a removable or displaceable boot 230, the boot must be removed or displaced in order to bleed the control device 60 or to adjust the volume of the fluid chamber 138. The shape and configuration of the optional removable boot can vary considerably, as desired or needed for a given control device application. In this example, the boot 230 has a displaceable flap 233 coupled to a conical portion 235. The conical portion 235 is received over the fluid line 62 and covers a fitting 237 connecting the fluid line to the housing 70 and can remain in place over the fitting at all times. The displaceable flap 233 carries the projections 322, 234 and can be fitted over the opening 200 and the bleed port 180. When access to these orifices or access points is desired, the displaceable flap 233 can be peeled away from the housing 70 and bent out of the way to expose the opening 200 and bleed port 180.

An advantage of the disclosed control devices is that the housing 70 can be mounted right against or on the handlebars 38 and in an under-bar location. The lever 74 is thus also positioned under the handlebars 38, but spaced a distance below the handlebars and the housing 70. The offset distance between the lever 74 and the drive arm 100 allows for this arrangement and the arrangement provides for a better ergonomic position for the lever. Further, use of the pivoting lever 74 with an actuation surface 76 that is displaced radially from the pivot axis P provides a mechanical advantage to the rider when actuating the control device 60. Translating this pivoting motion to linear movement of the piston 140 along the piston axis S could create binding in the actuation mechanism 72. However, the design of the components along the pivot axis P and the piston 140 help to address this concern, as described further below.

Referring to FIG. 8, the piston axis S of the piston 140 is offset relative to the pivot axis P of the lever 74. In this example, the piston axis S does not intersect the pivot axis P and is generally perpendicular to the pivot axis. The piston axis S is offset a distance D1 relative to the pivot axis, as depicted in FIG. 8. The lever 74 is also offset relative to the piston axis S. A first plane X may be defined as perpendicular to the pivot axis P and as also containing the piston axis S. In other words, the piston axis S lies in the first plane X. A second plane Y may be defined as also perpendicular to the pivot axis P and extending through the actuation surface 76 of the lever 74. In this example, the first plane X and second plane Y are offset from one another a distance D2. In one example, the distance D1 between the pivot axis P and the piston axis S may be about 14.5 millimeters. In one example, the distance D2 between the first plane X and second plane Y may be about 19 millimeters. In an embodiment a fluid chamber 138 section in which the piston seal 156 acts is a cylinder having a radius, and a minimum distance D2 between the first plane X and the second plane Y is larger than a radius of the cylinder, for example as is shown in FIG. 8.

The configuration of the actuation mechanism 72, and particularly the arrangement of the shank 80, sleeve 88, bearing 114, and driven end 104, create stability in the control device about the pivot axis P. Placing the bearing 114 axially on one side of the drive arm 100 along the pivot axis P and the shank 80 and sleeve 88 axially on the other side of the drive arm balances the loads to prevent binding in the pivot axis P. A load T applied to the actuation surface 76 of the lever 74 is transmitted as torque through the shank 80 to the drive arm 100. Torque applied to the driven end 104 of the drive arm 100 is transmitted as a load applied by the drive end 110 of the drive arm to the piston head 148. Further, referring to FIGS. 9 and 10, the piston head 148 in this example has a scalloped, smaller diameter portion 236 near the first axial end 150. This can reduce surface contact and thus potential binding between the piston 140 and the piston cylinder 146 as well. Also, a tip 238 of the piston stem 160 can be rounded to further prevent any binding between the spring 162 and the stem 160. These features can reduce binding forces in the control device and can reduce noise which might otherwise be caused by such binding during actuation of the control device.

The actuation mechanism 72 can include hard stops in both travel directions. As noted above, the lever 74 can have a hard stop in the spring biased direction defined by the fixed position of the cap 166 in the opening 154. The first axial end 150 of the piston 140 is biased by the spring 162 away from the fluid chamber 138. The drive end 110 of the drive arm 100 is borne against the first axial end 150. The drive end 110 contacts the cap 166, which prevents further travel of the piston 140, and thus the lever 74, in the released direction. Referring to FIGS. 7A and 7B, the circumferential outer surface 240 of the driven end 104 may be non-circular or otherwise have a protrusion 242. The protrusion 242 may act against one of the terminal ends 98a, 98b or another part of the through-bore 122 or housing 70 to act as a stop in the other actuation direction. Hard stops, if provided, may be created in different ways, if desired.

Referring to FIGS. 1-3, the dropper post 36 may include an upper tube 250 movable relative to a lower tube 252. A popper valve (not shown) within the dropper post 36 is closed and prevents transfer of hydraulic fluid within the dropper post between fluid chambers. This locks the upper and lower tubes 250, 252 relative to one another preventing height adjustment of the dropper post 36, as is known in the art. Fluid pressure from the dropper post 36 through the fluid line 62 fills the fluid chamber 138 via a fluid port 254 in the housing 70. The fluid port 254 may be defined in part by or through the aforementioned fitting 237, which connects the fluid line 62 to the housing 70. Fluid pressure through the fluid line 62, as well as the spring 162, bias the piston 140 in a direction away from the fluid chamber 138 to the hard stop against the cap 166, as noted above.

If a rider wishes to adjust the height of the dropper post 36, the rider actuates the control device 60 by pushing on the actuation surface 76 of the lever 74 in the direction of the arrow T. Rotating the lever 74 about the pivot axis P also rotates the drive arm 100 in the same direction. This causes the drive end 110 to push on the first axial surface 150 of the piston 140, which pushes the piston in a direction toward the fluid chamber 138. This reduces the volume of the fluid chamber, which results in hydraulic fluid being forced through the fluid port 254 and the fluid line 62 to the dropper post 36. This fluid pressure will open the poppet valve in the dropper post 36. By opening the poppet valve, fluid in the dropper post can transfer between fluid chambers, allowing the upper tube 250 to move relative to the lower tube 252.

If a rider wants to lower the height of the dropper post 36, the rider uses their own weight to push the seat 34 down while holding the lever 74 in the actuated position. The rider's weight will push the upper tube 250 down into the lower tube 252. The rider can then release the lever 74. Fluid pressure through the line 62 and the spring 162 will cause the piston 140 to return, moving in the direction away from the fluid chamber 138. This will close the poppet valve in the dropper post 36, locking the upper and lower tubes 250, 252 in the new adjusted position. If a rider wants to raise the height of the dropper post 36, the rider can push or actuate the lever 74 in the direction T to open the poppet valve in the dropper post, as noted above. Holding the lever 74 in the actuated position, hydraulic fluid will be able to again bypass the poppet valve in the dropper post 36. Fluid pressures in the dropper post 36 will cause the upper tube 250 to rise relative to the lower tube 252, as is known in the art. The rider can release the lever 74 when the desired seat height is achieved. The poppet valve in the dropper post 36 will close, locking the upper tube and lower tube 250, 252 relative to one another at the adjusted height.

A further advantage of the disclosed control devices is that the rider can adjust the lever 74 starting position to a comfortable orientation. The rider can simply loosen the bolt 116 to release the surface features 132 between the shank 80 and driven end 104. The rider can then rotate the lever 74 to a desired starting orientation or angular position without rotating the drive arm 100, as noted above. The rider can then tighten the bolt to retain the lever 74 in the desired starting position or orientation. Another advantage of the disclosed control devices is that the lever 74 can be positioned under the handlebars 38 when mounted to the bicycle 20, making it easier for the rider to access the lever while keeping a grip on the handlebars.

Another advantage of the disclosed control devices is that the volume adjustment feature 144 can be used to alter the delay or lag at the beginning of the throw of the lever 74 during actuation. This delay or lag may be referred to as dead-band of the throw of the lever, with the volume adjustment feature 144 configured to alter (i.e. either lengthen or shorten) the dead-band. This adjustment can be used to set how quickly rotation of the lever 74 will open the poppet valve of the dropper post 36. The rider can make this adjustment to achieve a personal preference in how the dropper post 36 operates and/or to adjust the volume of the fluid chamber 138 to account for a change in fluid temperature, such as would be caused by a significant ambient temperature change. Without the volume adjustment mechanism 144 and the adjustable volume fluid reservoir 206, any change in fluid temperature would act as a "speed adjustment" to the control device.

Rotating the adjustment screw 202 into the housing 70, i.e., further into the opening 200 in this example, reduces the reservoir volume of the fluid reservoir. This in turn reduces the overall volume of the fluid chamber 138, forcing an amount of hydraulic fluid into the fluid line 62 with the lever 74 in its unactuated position. This can add fluid pressure to the line 62, slightly pre-loading or moving the poppet valve closer to an open position or at least to a point where any more fluid pressure will begin to open the poppet valve. Pushing on the lever 74 to any degree in the direction of the arrow T may then immediately open the poppet valve, resulting in a fast or quick reaction in the dropper post 36 changing in height. Pushing further on the lever 74 will then ore quickly move the poppet valve in the dropper post 36 to a fully open position which will achieve fast seat height adjustment more quickly.

To the contrary, rotating the adjustment screw 202 outward on the housing, i.e., further out of the opening 200 in this example, increases the reservoir volume of the fluid reservoir. This in turn increases the volume of the fluid chamber 138, resulting in less fluid and thus fluid pressure in the fluid line 62 to the dropper post 36. Any initial rotation of the lever 74 to actuate the control device 60 will first simply increase the fluid pressure to the line 62 without opening or only slightly opening the poppet valve. Thus, the dropper post 36 will either not move or only move very slowly at first, until the lever 74 is actuated or rotated further. The rider can thus use the volume adjustment mechanism 144 to change the "speed' or reaction time of the dropper post 36 relative to the degree of actuation of the control device 60.

Yet another advantage of the disclosed control devices is that the bleed device 142 may be used to quickly bleed excess fluid from the hydraulic system if needed upon refilling the system or upon a change in fluid temperature. The rider need only access the bleed screw 190 within the bleed port 180 and insert the necessary tool directly into the blind tool engagement hole 192. The bleed screw 190 can be rotated to an open position, disengage the sealing surface of the screw from the seat 188. This opens the bleed passage 186. Excess fluid from the fluid chamber 138 can then flow via the bleed passage 186 past the seat 188. The excess fluid can then flow through the cross bores or holes 196 in the tip of the bleed screw 190 to the blind tool engagement hole 192 to exit the bleed port 180. The rider can rotate the bleed screw 190 in the opposite direction until the sealing surface 194 tightly engages the seat 188 to close the bleed device 142 and then remove the tool. In this closed position, fluid cannot reach the cross bores or holes 196 from the bleed passage 186 because fluid cannot bypass the seat 188 and sealing surface 194.

Still another advantage of the disclosed control devices is that both the bleed port 180 of the bleed device 142 and the opening 200 of the volume adjustment mechanism 144 can be readily accessed on the outside of the housing 70. Both can be accessed without having to remove or dismantle any portion of the control device 60, as both face in the same direction on the housing, facing the rider. Access to both the opening 200 and the bleed port 180 is unimpeded by any part of the bicycle or the control device 60, except for the optional boot 230. If the control device includes a protective boot 230 that covers these to access points, the boot must first be removed to expose these access points. However, in this example, the boot may be installed on the housing with no fasteners. The boot 230 can be form fitted and retained by friction on the housing 70. The rider may simply need to pull on the boot 230 to remove the protrusions or plugs 232 from the opening 200 and bleed port 180 to remove the boot.

Although certain control devices for hydraulic valve bicycle components and methods relating to same have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A control device for a hydraulic valve bicycle component, the control device comprising:
   a housing defining a fluid port in fluid communication with a hydraulic valve of a bicycle component;
   a lever having a proximal end coupled to the housing and a distal end, the proximal end of the lever rotatable about a pivot axis, the lever including an actuation surface near the distal end;
   a cavity within the housing, the cavity including a fluid chamber in fluid communication with the fluid port;
   a piston disposed within the cavity and movable along a piston axis by actuation of the lever, the piston having a piston head and a seal element creating a seal between the piston head and a surface of the cavity;
   a drive arm formed as a distinct piece operatively coupled to the lever at an interface, the drive arm having a drive end configured to move the piston along the piston axis, and
   a sleeve configured to fit around the interface of the drive arm and the lever,
   wherein a first plane perpendicular to the pivot axis and containing the piston axis is offset a distance from a second plane perpendicular to the pivot axis and extending through the actuation surface of the lever, the sleeve extending along at least a portion of the distance.

2. The control device of claim 1, wherein the piston axis is not parallel to the pivot axis.

3. The control device of claim 1, wherein the piston axis, the first plane, and the second plane are perpendicular to the pivot axis.

4. The control device of claim 1, wherein the actuation surface of the lever is spaced a radial distance from the pivot axis, and wherein the lever extends radially relative to the pivot axis and is actuable to pivot the lever about the pivot axis.

5. The control device of claim 1, wherein the actuation surface of the lever is positioned and arranged to rotate beneath the housing without contacting the housing when the control device is installed on a bicycle.

6. The control device of claim 1, further comprising:
   surface features at the interface of the lever and drive arm configured to rotationally lock the drive arm and lever.

7. The control device of claim 1, wherein the piston is slidably received in a piston cylinder defined within the cavity, the piston having a first axial end facing away from the fluid chamber and having a second axial end facing and exposed to the fluid chamber.

8. The control device of claim 7, wherein the seal element is positioned on the piston head between the first axial end and the second axial end, and wherein the first axial end is on one end of the piston head and the second axial end is on another end of the piston head opposite the first axial end.

9. The control device of claim 7, further comprising:
   the drive arm having the driven end operatively coupled to the lever and having a drive end opposite the driven end, the driven end rotatable in concert with the lever about the pivot axis, the drive end contacting the first axial end of the piston to move the piston along the piston axis in a direction to reduce a volume of the fluid chamber to push fluid out the fluid port.

10. The control device of claim 7, further comprising;
    the drive arm having the driven end operatively coupled to the lever and having a drive end opposite the driven end, the driven end rotatable in concert with the lever about the pivot axis, the drive end configured to move the piston along the piston axis in a first direction reducing a volume of the fluid chamber and pushing fluid out the fluid port.

11. The control device of claim 1, further comprising:
    the drive arm extending radially relative to the pivot axis and having the driven end operatively coupled to the lever, the drive arm rotatable about the pivot axis and having a drive end configured to move the piston in one direction along the piston axis, wherein an angular position of the lever relative to an angular position of the drive arm is selectively adjustable about the pivot axis.

12. The control device of claim 1, further comprising:
    a shank on the proximal end of the lever, the shank concentric with the pivot axis,
    the sleeve being concentric with the shank, the sleeve having a slot formed into one end of the sleeve, the slot having a width in a circumferential direction around the sleeve; and
    the drive arm operatively coupled to the shank along the pivot axis, the drive arm extending radially relative to the pivot axis and through the slot of the sleeve,
    wherein the drive arm is rotatable about the pivot axis within a range of motion limited by the width of the slot, the drive arm configured to move the piston in one direction along the piston axis.

13. The control device of claim 12, wherein an end of the shank facing the drive arm and a face of a portion of the drive arm facing the shank are formed having interlocking surface features in contact with one another within the sleeve.

14. The control device of claim 12, further comprising:
    a bearing positioned along the pivot axis concentric with the shank, a portion of the drive arm being sandwiched between the bearing and the shank within the sleeve.

15. The control device of claim 14, further comprising:
    a bore through the housing, the shank extending into one end of the bore and into the sleeve; and
    a fastener extending through an opposite end of the bore, the fastener secured to the shank through the bearing and the portion of the drive arm.

16. The control device of claim 1, further comprising:
    a biasing element received in the fluid chamber and configured and arranged to bias the piston in a direction away from the fluid port of the housing, wherein actuation of the lever, through contact with a first axial end of the piston, moves the piston in a direction toward the fluid port.

17. The control device of claim 16, wherein the biasing element is a spring in contact with a second axial end of the piston.

18. The control device of claim 17, wherein the piston has a stem extending from the second axial end, wherein the spring is a coil spring seated around the stem, and wherein the stem has a domed or rounded free distal end shape.

19. The control device of claim 1, further comprising:
a bleed port in the housing in fluid communication with the fluid chamber; and
a bleed screw accessible in the bleed port, the bleed screw selectively adjustable between a closed position sealing off the bleed port and an open position permitting fluid to escape the fluid chamber through the bleed port.

20. The control device of claim 19, wherein the bleed screw is accessible from outside of the housing when the control device is installed on a bicycle.

21. The control device of claim 19, further including a volume adjustment mechanism comprising:
an opening in the housing in communication with the fluid chamber,
a fluid reservoir in fluid communication with the fluid chamber; and
an adjustment screw received in the opening, the adjustment screw movable within the opening to selectively vary an adjustable volume of the fluid reservoir, which selectively varies a chamber volume of the fluid chamber.

22. The control device of claim 1, further including a volume adjustment mechanism comprising:
an opening in the housing in communication with the fluid chamber; and
an adjustment screw received in the opening, the adjustment screw movable within the opening to selectively vary a chamber volume of the fluid chamber.

23. A control device for a hydraulic bicycle component, the control device comprising:
a housing defining a fluid port in fluid communication with a hydraulic bicycle component;
a lever having a proximal end pivotally coupled to the housing and having a distal end, the lever pivotable about a pivot axis and having an actuation surface near the distal end;
a cavity within the housing, the cavity including a fluid chamber in fluid communication with the fluid port; and
a volume adjustment mechanism,
wherein the volume adjustment mechanism includes an opening in the housing in communication with the fluid chamber, and
an adjustment screw received in the opening and accessible from an outside of the housing, the adjustment screw movable to selectively vary a chamber volume of the fluid chamber.

24. The control device of claim 23, wherein the volume adjustment mechanism further includes a fluid reservoir in fluid communication with the fluid chamber, wherein the adjustment screw is movable to selectively vary a reservoir volume of the fluid reservoir, which varies the chamber volume of the fluid chamber.

25. The control device of claim 23, wherein the volume adjustment mechanism further includes:
a groove around an interior surface of the opening outboard of the adjustment screw; and
a snap ring received the groove to inhibit the adjustment screw from being backed completely out of the opening.

26. The control device of claim 25, wherein the volume adjustment mechanism further includes an O-ring received in a ring groove around an outer circumference of the adjustment screw, the O-ring arranged to create a seal between a surface of the opening and the adjustment screw.

27. The control device of claim 23, wherein the volume adjustment mechanism further includes a fluid reservoir within the opening and inboard of a free end of the adjustment screw, the fluid reservoir in fluid communication with the fluid chamber, wherein the adjustment screw is movable to selectively vary a reservoir volume of the fluid reservoir, which varies the chamber volume of the fluid chamber, and wherein the fluid reservoir has a first diameter within the opening and has a flow hole between the fluid chamber and the fluid reservoir, the flow hole having a second diameter smaller than the first diameter.

28. The control device of claim 23, further comprising:
a removable boot on the housing, the removable boot covering at least a portion of the housing including the adjustment screw and the opening of the volume adjustment mechanism.

29. The control device of claim 23, further comprising:
a bleed port in the housing in fluid communication with the fluid chamber; and
a bleed screw accessible in the bleed port for selectively opening and sealing the bleed port,
wherein the bleed screw is accessible outside of the housing when the control device is installed on a bicycle.

30. The control device of claim 29, further comprising:
a removable boot on the housing, the removable boot covering at least a portion of the housing including the adjustment screw and the opening of the volume adjustment mechanism and the bleed screw and the bleed port.

31. The control device of claim 29, further comprising:
a piston disposed within the cavity and movable along a piston axis, wherein the piston axis is spaced a distance from the pivot axis.

* * * * *